US012794372B2

(12) United States Patent
Liu et al.

(10) Patent No.: US 12,794,372 B2
(45) Date of Patent: Nov. 10, 2026

(54) MULTI-PHASE CONVERSION CIRCUIT WITH PARALLEL SUB-CONVERSION PATHS AND CONTROL METHOD THEREOF

(71) Applicant: Richtek Technology Corporation, Hsinchu (TW)

(72) Inventors: Kuo-Chi Liu, Hsinchu (TW); Ta-Yung Yang, Taoyuan (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 160 days.

(21) Appl. No.: 18/637,432

(22) Filed: Apr. 16, 2024

(65) Prior Publication Data

US 2024/0372467 A1 Nov. 7, 2024

Related U.S. Application Data

(60) Provisional application No. 63/499,711, filed on May 2, 2023.

(30) Foreign Application Priority Data

Oct. 31, 2023 (TW) ................................ 112141688

(51) Int. Cl.

| | |
|---|---|
| ***H02M 3/158*** | (2006.01) |
| ***H02M 1/00*** | (2007.01) |
| ***H02M 3/00*** | (2006.01) |
| ***H02M 3/07*** | (2006.01) |

(52) U.S. Cl.
CPC ....... *H02M 3/1584* (2013.01); *H02M 1/0095* (2021.05); *H02M 3/01* (2021.05); *H02M 3/077* (2021.05)

(58) Field of Classification Search
CPC ...... H02M 3/07; H02M 1/0095; H02M 3/158; H02M 3/1582; H02M 3/1584; H02M 3/1588; H02M 3/1586; H02M 1/08; H02M 3/01; H02M 1/088; H02M 3/077
See application file for complete search history.

(56) References Cited

U.S. PATENT DOCUMENTS

2022/0368218 A1* 11/2022 Liu ......................... H02M 3/01
2024/0235370 A1* 7/2024 Liu ......................... H02M 3/07
2024/0297580 A1* 9/2024 Liu ..................... H02M 1/0095
2026/0066789 A1* 3/2026 Liu ......................... H02M 1/44

* cited by examiner

*Primary Examiner* — Jue Zhang
*Assistant Examiner* — Ularislao Cordova
(74) *Attorney, Agent, or Firm* — Winston Hsu

(57) ABSTRACT

A multi-phase conversion circuit includes: a first and a second sub-conversion circuits; multiple switching signals control the first front switch-mode capacitor conversion circuit's first front capacitor and the first rear switch-mode capacitor conversion circuit's first rear capacitor, and the second front switch-mode capacitor conversion circuit's second front capacitor and the second rear switch-mode capacitor conversion circuit's second rear capacitor to switch between plural electrical connection states. This setup performs switched capacitor voltage division on the first voltage, selectively switching the first or second switching node between the first or second divided voltage derived from the switched capacitor voltage division and a reference potential, whereby performing power conversion between the first power node and the second power node.

30 Claims, 32 Drawing Sheets

| status / item | ST1 | ST2 | ST3 | ST4 | ST5 | ST6 | ST7 | ST8 |
|---|---|---|---|---|---|---|---|---|
| Q1 | V | | V | | V | | | V |
| Qsuf1 | V | | V | | V | | | |
| Qsur1 | V | | V | | V | | V | |
| Qcrf1 | | V | | V | | V | | V |
| QLf1 | | V | | V | | V | | |
| Qcrr1 | | V | | V | | V | | V |
| QLr1 | | V | | V | | V | V | |
| Q2 | | V | V | | | V | | V |
| Qsuf2 | | V | V | | | V | | |
| Qsur2 | | V | V | | | V | V | |
| Qcrf2 | V | | | V | V | | | V |
| QLf2 | V | | | V | V | | | |
| Qcrr2 | V | | | V | V | | | V |
| QLr2 | V | | | V | V | | V | |
| Vcf1, Vcf2 (ST1~ST6) | (1/2)*V1 | (1/2)*V1 | (1/3)*V1 | (1/3)*V1 | (1/2)*V1 | (1/2)*V1 | VLX1, VLX2 grounded | VLX1,VLX2 connected with V1 |
| Vcr1, Vcr2 | (1/4)*V1 | (1/4)*V1 | (1/3)*V1 | (1/3)*V1 | (1/4)*V1 | (1/4)*V1 | | |
| Capacitor coupling relationship | Cf1, Cr1 connected in series with Co; Cf1, Cf2 forming a voltage divider; Cr2 connected in parallel with Co | Cf2, Cr2 connected in series with Co; Cf2, Cf1 forming a voltage divider; Cr1 connected in parallel with Co | Cf1, Cr1 connected in series with Co; Cf2, Cr2 connected in series with Co | Cf1, Cf2, Cr1, Cr2 connected in parallel with Co respectively | Cf1, Cr1 connected in series with Co; Cf1, Cf2 forming a voltage divider; Cr2 connected in parallel with Co | Cf2, Cr2 connected in series with Co; Cf2, Cf1 forming a voltage divider; Cr1 connected in parallel with Co | | |

Fig. 8A

| status / item | ST9 | ST10 | ST11 | ST12 |
|---|---|---|---|---|
| Q1 | V | | V | V |
| Qsuf1 | V | | | |
| Qsur1 | | | V | |
| Qcrf1 | | V | V | |
| QLf1 | | V | V | V |
| Qcrr1 | V | V | | V |
| QLr1 | V | V | | V |
| Q2 | V | | V | V |
| Qsuf2 | V | | | |
| Qsur2 | | | V | |
| Qcrf2 | | V | V | |
| QLf2 | | V | V | V |
| Qcrr1 | V | V | | V |
| QLr2 | V | V | | V |
| Vcf1, Vcf2 | (1/2)*V1 | (1/2)*V1 | V1 | V1 |
| Vcr1, Vcr2 | V2 | V2 | (1/2)*V1 | (1/2)*V1 |
| Capacitor coupling relationship | Cf1 connected in series with Co; Cf2 connected in series with Co; Cr1 connected in parallel with Co ; Cr2 connected in parallel with Co | Cf1 connected in parallel with Co; Cr1 connected in parallel with Co; Cf2 connected in parallel with Co; Cr2 connected in parallel with Co | Cr1 connected in series with Co; Cr2 connected in series with Co; Cf1, Cf2 connected in parallel with Cin | Cr1 connected in parallel with Co; Cr2 connected in parallel with Co |

Fig. 8B

| status / item | ST13 | ST14 | ST15 | ST16 |
|---|---|---|---|---|
| Q1 | V | | | |
| Qsuf1 | V | | | |
| Qsur1 | V | V | | V |
| Qcrf1 | | V | | |
| QLf1 | | V | | |
| Qcrr1 | | | V | |
| QLr1 | | V | V | V |
| Q2 | | V | | |
| Qsuf2 | | V | | |
| Qsur2 | V | V | V | |
| Qcrf2 | V | | | |
| QLf2 | V | | | |
| Qcrr2 | | | | V |
| QLr2 | V | | V | V |
| Vcf1, Vcf2 | (1/2)*V1 | (1/2)*V1 | (1/2)*V1 | (1/2)*V1 |
| Vcr1, Vcr2, VLX1, VLX2 | Vcr1=(1/4)*V1；Vcr2= floating, (1/4)*V1 VLX2=0 | Vcr2=(1/4)*V1 Vcr1=floating, (1/4)*V1 VLX1=0 | VLX1=Vcr1=(1/4) *V1 VLX2=0 | VLX2=Vcr2=(1/4) *V1 VLX1=0 |
| Capacitor coupling relationship | Cf1, Cr1 connected in series with Co; Cf1, Cf2 forming a voltage divider; Cr2 connected in parallel with Co | Cf2, Cr2 connected in series with Co；Cf2, Cf1 forming a voltage divider；Cr1 connected in parallel with Co | A series connection of Cr1, L1 is connected in parallel with Co；L2 connected in parallel with Co | A series connection of Cr2, L2 is connected in parallel with Co；L1 connected in parallel with Co |

Fig. 8C

MULTI-PHASE CONVERSION CIRCUIT WITH PARALLEL SUB-CONVERSION PATHS AND CONTROL METHOD THEREOF

CROSS REFERENCE

The present invention claims priority to the U.S. provisional patent application Ser. No. 63/499,711, filed on May 2, 2023, and claims priority to the TW patent application Ser. No. 112141688, filed on Oct. 31, 2023.

BACKGROUND OF THE INVENTION

Field of Invention

The present invention relates to a multi-phase conversion circuit, specifically to a multi-phase conversion circuit and its control method that can support more voltage conversion ratios.

Description of Related Art

FIG. 1 shows a circuit schematic of a prior art dual-phase conversion circuit. This prior art dual-phase conversion circuit requires high-rated voltage due to the configuration of the flying capacitors. Furthermore, the DC bias of capacitors C1 and C4 is three times the output voltage Vout, resulting in lower effective capacitance. Therefore, more flying capacitors are needed to compensate for the effects of high DC bias. In addition, this prior art dual-phase conversion circuit has a large number of switches, and if resonant inductors are to be configured, the number would be considerably large, making the conversion ratio less flexible.

In view of this, the present invention proposes a multi-phase conversion circuit and its control method that can support more voltage conversion ratios.

SUMMARY OF THE INVENTION

From one perspective, the present invention provides a multi-phase conversion circuit for converting a first voltage of a first power source at a first power node to a second voltage of a second power source at a second power node, including: a first sub-conversion circuit, coupled between the first and second power nodes; a second sub-conversion circuit, coupled between the first and second power nodes; and a control circuit, configured to generate plural switching signals to control the first and second sub-conversion circuits for converting the first voltage to the second voltage; wherein the first sub-conversion circuit includes: a first switch coupled to the first power node; a first front switched-capacitor conversion circuit, connected between the first switch and a first switching node, and including a first front bridging switch, a first front low-side switch, a first front subordinate switch, and a first front capacitor; and a first rear switched-capacitor conversion circuit, connected between the first switching node and the second power node, and including a first rear bridging switch, a first rear low-side switch, a first rear subordinate switch, and a first rear capacitor; wherein the first switch, the first front switched-capacitor conversion circuit, and the first rear switched-capacitor conversion circuit are sequentially connected in series between the first and second power nodes; wherein the second sub-conversion circuit includes: a second switch coupled to the first power node; a second front switched-capacitor conversion circuit, connected between the second switch and a second switching node, and including a second front bridging switch, a second front low-side switch, a second front subordinate switch, and a second front capacitor; and a second rear switched-capacitor conversion circuit, connected between the second switching node and the second power node, and including a second rear bridging switch, a second rear low-side switch, a second rear subordinate switch, and a second rear capacitor; wherein the second switch, the second front switched-capacitor conversion circuit, and the second rear switched-capacitor conversion circuit are sequentially connected in series between the first and second power nodes; wherein the first and second sub-conversion circuits are configured to periodically switch the electrical connection relationships of the first and second front and/or rear capacitors between plural electrical connection states according to the plural switching signals; wherein the plural switching signals control the first and second front and/or rear capacitors to perform switched capacitor voltage division on the first voltage, switching the first switching node between a first divided voltage of the first voltage and a first reference potential, and switching the second switching node between a second divided voltage of the first voltage and a second reference potential, thereby performing power conversion from the first power node to the second power node; wherein the first and second reference potentials are respectively related to the first voltage or its division, a ground potential, the across-voltage of the first and second front and/or the across-voltage of rear capacitors; wherein the first front subordinate switch is coupled between the first front capacitor and the first switching node, configured to determine whether the first front capacitor and the first switching node are electrically connected according to the corresponding switching signal; wherein the first rear subordinate switch is coupled between the first rear capacitor and the second power node, configured to determine whether the first rear capacitor and the second power node are electrically connected according to the corresponding switching signal; wherein the second front subordinate switch is coupled between the second front capacitor and the second switching node, configured to determine whether the second front capacitor and the second switching node are electrically connected according to the corresponding switching signal; and wherein the second rear subordinate switch is coupled between the second rear capacitor and the second power node, configured to determine whether the second rear capacitor and the second power node are electrically connected according the corresponding switching signal.

In one embodiment, the plural electrical connection states include a first electrical connection state and a second electrical connection state; wherein the first electrical connection state includes: the first front capacitor and the first rear capacitor serially connected between the first power node and the second power node, and the first power source charging the first front capacitor and the first rear capacitor; the second front capacitor and the first rear capacitor serially connected between the second power node and the ground potential, and the across-voltage of the second front capacitor being discharged to the second power source through the first rear capacitor; and the second rear capacitor electrically connected between the second power source and the ground potential, and the across-voltage of the second rear capacitor is discharged to the second power source; wherein the second electrical connection state includes: the second front capacitor and the second rear capacitor serially connected between the first power node and the second power node, and the first power source charging the second front capacitor and the second rear capacitor; the first front capacitor and the second rear capacitor serially connected between the second power node and the ground potential, and the across-voltage of the first front capacitor being discharged to the second power source through the second rear capacitor; and the first rear capacitor electrically connected between the second power source and the ground potential, and the across-voltage of the first rear capacitor is discharged to the second power source; wherein the plural switching signals operate the first and second sub-conversion circuits between the first and second electrical connection states to perform switching capacitive division of the first voltage, respectively switching the first switching node between the first divided voltage of the first voltage and the first reference potential obtained from the switching capacitive division, and switching the second switching node between the second divided voltage of the first voltage and the second reference potential, thereby converting the first power source to the second power source; wherein the first and second reference potentials are respectively the across-voltage of the first rear capacitor and the across-voltage of the second rear capacitor, and both the first and second divided voltages are half of the first voltage.

In one embodiment, the duty cycle of the plural switching signals is 50%, and the across-voltage of both the first front capacitor and the second front capacitor is half of the first voltage, and the across-voltage of both the first rear capacitor and the second rear capacitor is a quarter of the first voltage.

In one embodiment, the multi-phase conversion circuit further includes a first inductor included in the first sub-conversion circuit and a second inductor included in the second sub-conversion circuit, wherein the first inductor is coupled between the first rear capacitor and the second power node, and the second inductor is coupled between the second rear capacitor and the second power node.

In one embodiment, the plural electrical connection states include a first electrical connection state and a second electrical connection state: wherein the first electrical connection state includes: the first front capacitor and the first rear capacitor serially connected between the first power node and the second power node, with the first power source charging the first front capacitor and the first rear capacitor through the first inductor; the second front capacitor and the first front capacitor serially connected between the first power node and the ground potential, with the across-voltage of the second front capacitor being discharged to the second power source through the first inductor and the first rear capacitor; and the second rear capacitor and the second inductor serially connected between the second power source and the ground potential, with the second rear capacitor being discharged to the second power source through the second inductor; wherein the second electrical connection state includes: the second front capacitor and the second rear capacitor serially connected between the first power node and the second power node, with the first power source charging the second front capacitor and the second rear capacitor through the second inductor; the first front capacitor and the second front capacitor serially connected between the first power node and the ground potential, with the first front capacitor being discharged to the second power source through the second inductor and the second rear capacitor; and the first rear capacitor and the first inductor serially connected between the second power source and the ground potential, with the first rear capacitor being discharged to the second power source through the first inductor; wherein the plural switching signals operate the first and second sub-conversion circuits between the first and second electrical connection states to perform switching capacitive division of the first voltage, respectively switching the first switching node between the first divided voltage of the first voltage and the first reference potential obtained from the switching capacitive division, and the second switching node between the second divided voltage of the first voltage and the second reference potential, thereby converting the first power source to the second power source; wherein the first and second reference potentials are respectively the across-voltage of the first rear capacitor and the across-voltage of the second rear capacitor, and both the first and second divided voltages are half of the first voltage.

In one embodiment, the duty cycle of the plural switching signals is 50%, and the across-voltage of both the first front capacitor and the second front capacitor is half of the first voltage, and the across-voltage of both the first rear capacitor and the second rear capacitor is a quarter of the first voltage.

In one embodiment, the switching frequency includes a first resonance frequency related to the resonance of the first inductor and the first rear capacitor, and a second resonance frequency related to the resonance of the second inductor and the second rear capacitor.

In one embodiment, the control circuit further generates the switching signals according to a zero-current detection signal indicating at least one of the following: a first inductor current flowing through the corresponding first inductor is zero, or a second inductor current flowing through the corresponding second inductor is zero.

In one embodiment, the time point when the first inductor current is zero is a first zero-current time point, the time point when the second inductor current is zero is a second zero-current time point, and the control circuit, after the first zero-current time point and/or the second zero-current time point, waits for a corresponding first dead-time and/or a second dead-time before generating the switching signals to switch the electrical connection states.

In one embodiment, the first inductor and the second inductor are electromagnetically coupled in an opposing manner through a magnetic material.

In one embodiment, a single inductor serves both as the first inductor and the second inductor.

In one embodiment, the control circuit adjusts the duty cycle of the plural switching signals according to a conversion ratio.

In one embodiment, the order in which the first front capacitor and the second front capacitor are electrically connected in series between the first power node and the ground potential alternates based on a specific period to achieve charge balance.

In one embodiment, the switching frequency is related to a resonance frequency, enabling the multi-phase conversion circuit to operate in a resonance mode, controlling the voltage ratio between the second voltage and the first voltage to be related to the division ratio of the first voltage and the first or the second divided voltage of the first voltage; wherein the resonance frequency is related to the capacitance value of the first front capacitor and/or the first rear capacitor and the inductance value of the first inductor, or the capacitance value of the second front capacitor and/or the second rear capacitor and the inductance value of the second inductor.

In one embodiment, the switching frequency is significantly higher than a resonance frequency, enabling the multi-phase conversion circuit to operate in a non-resonance mode, thereby regulating the second voltage at a predetermined level or the first voltage at a predetermined level;

wherein the resonance frequency is related to the capacitance value of the first front capacitor and/or the first rear capacitor and the inductance value of the first inductor, or the capacitance value of the second front capacitor and/or the second rear capacitor and the inductance value of the second inductor.

From another perspective, the present invention provides a control method for a multi-phase conversion circuit, including: generating plural switching signals to periodically switch the electrical connection relationships of a first front capacitor and/or a first rear capacitor of a first sub-conversion circuit and a second front capacitor and/or a second rear capacitor of a second sub-conversion circuit within the multi-phase circuit between plural electrical connection states, based on a switching frequency, for conducting power conversion between a first voltage of a first power source at a first power node and a second voltage of a second power source at a second power node; wherein the first sub-conversion circuit includes a first switch, a first front switched capacitor conversion circuit, and a first rear switched capacitor conversion circuit which are coupled in series, wherein the first switch is coupled to the first power node, the first front switched capacitor conversion circuit is coupled between the first switch and a first switching node, and the first rear switched capacitor conversion circuit is coupled between the first switching node and the second power node, wherein the first front switched capacitor conversion circuit includes a first front bridging switch, a first front low-side switch, a first front subordinate switch, and a first front capacitor, wherein the first rear switched capacitor conversion circuit includes a first rear bridging switch, a first rear low-side switch, a first rear subordinate switch, and a first rear capacitor, wherein the second sub-conversion circuit includes a second switch, a second front switched capacitor conversion circuit, and a second rear switched capacitor conversion circuit which are coupled in series, wherein the second switch is coupled to the first power node, the second front switched capacitor conversion circuit is coupled between the second switch and a second switching node, and the second rear switched capacitor conversion circuit is coupled between the second switching node and the second power node, wherein the second front switched capacitor conversion circuit includes a second front bridging switch, a second front low-side switch, a second front subordinate switch, and a second front capacitor, wherein the second rear switched capacitor conversion circuit includes a second rear bridging switch, a second rear low-side switch, a second rear subordinate switch, and a second rear capacitor; and operating the first front capacitor, the first rear capacitor, the second front capacitor, and/or the second rear capacitor to perform switched-capacitor voltage division of the first voltage between the plural electrical connection states, thereby switching the first switching node between a first divided voltage of the first voltage obtained from the switched-capacitor voltage division and a first reference potential, and switching the second switching node between a second divided voltage of the first voltage obtained from the switched-capacitor voltage division and a second reference potential, for the power conversion between the first power node and the second power node; wherein the first reference potential and the second reference potential are each related to the first voltage or its divided voltage, a ground potential, the across-voltage of the first front capacitor, the across-voltage of the first rear capacitor, the across-voltage of the second front capacitor, and/or the across-voltage of the second rear capacitor; wherein the first front subordinate switch is coupled between the first front capacitor and the first switching node, for determining whether the first front capacitor is electrically connected to the first switching node according to the corresponding switching signal; wherein the first rear subordinate switch is coupled between the first rear capacitor and the second power node, for determining whether the first rear capacitor is electrically connected to the second power node according to the corresponding switching signal; wherein the second front subordinate switch is coupled between the second front capacitor and the second switching node, for determining whether the second front capacitor is electrically connected to the second switching node according to the corresponding switching signal; wherein the second rear subordinate switch is coupled between the second rear capacitor and the second power node, for determining whether the second rear capacitor is electrically connected to the second power node according to the corresponding switching signal.

In one embodiment, the plural electrical connection states include: a first electrical connection state, having: the first front capacitor and the first rear capacitor serially connected between the first power node and the second power node, and the first power source charging the first front capacitor and the first rear capacitor; the second front capacitor and the first rear capacitor serially connected between the second power node and the ground potential, and the across-voltage of the second front capacitor is discharged to the second power source through the first rear capacitor; and the second rear capacitor electrically connected between the second power source and the ground potential, and the across-voltage of the second rear capacitor is discharged to the second power source; and a second electrical connection state, having: the second front capacitor and the second rear capacitor serially connected between the first power node and the second power node, and the first power source charging the second front capacitor and the second rear capacitor; the first front capacitor and the second rear capacitor serially connected between the second power node and the ground potential, and the across-voltage of the first front capacitor is discharged to the second power source through the second rear capacitor; and the first rear capacitor electrically connected between the second power source and the ground potential, and the across-voltage of the first rear capacitor is discharged to the second power source; wherein the plural switching signals operate the first sub-conversion circuit and the second sub-conversion circuit between the first electrical connection state and the second electrical connection state, to perform switched-capacitor voltage division of the first voltage, thereby switching the first switching node between the first divided voltage of the first voltage obtained from the switched-capacitor voltage division and the first reference potential, and switching the second switching node between the second divided voltage of the first voltage obtained from the switched-capacitor voltage division and the second reference potential, for the power conversion between the first power source and the second power source; wherein the first reference potential and the second reference potential are respectively the across-voltage of the first rear capacitor and the across-voltage of the second rear capacitor, and both the first divided voltage and the second divided voltage are half of the first voltage.

In one embodiment, the duty cycle of the plural switching signals is 50%, and both the across-voltage of the first front capacitor and the across-voltage of the second front capacitor are half of the first voltage, and both the across-voltage of the first rear capacitor and the across-voltage of the second rear capacitor are a quarter of the first voltage.

In one embodiment, the multi-phase conversion circuit further including a first inductor in the first sub-conversion circuit and a second inductor in the second sub-conversion circuit, wherein the first inductor is coupled between the first rear capacitor and the second power node, and the second inductor is coupled between the second rear capacitor and the second power node.

In one embodiment, the plural electrical connection states include a first electrical connection state and a second electrical connection state: wherein the first electrical connection state includes: serially connecting the first front capacitor and the first rear capacitor between the first power node and the second power node, enabling the first power source charging the first front capacitor and the first rear capacitor through the first inductor; serially connecting the second front capacitor and the first front capacitor between the first power node and the ground potential, enabling the across-voltage of the second front capacitor being discharged to the second power source through the first inductor and the first rear capacitor; and serially connecting the second rear capacitor and the second inductor between the second power source and the ground potential, enabling the second rear capacitor being discharged to the second power source through the second inductor; wherein the second electrical connection state includes: serially connecting the second front capacitor and the second rear capacitor between the first power node and the second power node, enabling the first power source charging the second front capacitor and the second rear capacitor through the second inductor; serially connecting the first front capacitor and the second front capacitor between the first power node and the ground potential, enabling the first front capacitor being discharged to the second power source through the second inductor and the second rear capacitor; and serially connecting the first rear capacitor and the first inductor between the second power source and the ground potential, enabling the first rear capacitor being discharged to the second power source through the first inductor; wherein the control method further includes: operating the first and second sub-conversion circuits between the first and second electrical connection states to perform switching capacitive division of the first voltage, respectively switching the first switching node between the first divided voltage of the first voltage and the first reference potential obtained from the switching capacitive division, and the second switching node between the second divided voltage of the first voltage and the second reference potential, thereby converting the first power source to the second power source; wherein the first and second reference potentials are respectively the across-voltage of the first rear capacitor and the across-voltage of the second rear capacitor, and both the first and second divided voltages are half of the first voltage.

In one embodiment, the duty cycle of the plural switching signals is 50%, and both the across-voltage of the first front capacitor and the across-voltage of the second front capacitor are half of the first voltage, and both the across-voltage of the first rear capacitor and the across-voltage of the second rear capacitor are a quarter of the first voltage.

In one embodiment, the switching frequency includes a first resonant frequency related to the resonance of the first inductor with the first rear capacitor, and a second resonant frequency related to the resonance of the second inductor with the second rear capacitor.

In one embodiment, the control method further includes: generating the switching signals for switching between the electrical connection states according to a zero-current detection signal indicative of at least one of the following: a first inductor current flowing through the corresponding first inductor being zero, or a second inductor current flowing through the corresponding second inductor being zero.

In one embodiment, the time point when the first inductor current is zero is a first zero-current time point, and the time point when the second inductor current is zero is a second zero-current time point, and the method further includes: after the first zero-current time point and/or the second zero-current time point, waiting for a corresponding first dead-time period and/or a second dead-time period before generating the switching signal to switch the electrical connection state.

In one embodiment, the control method further includes: magnetically coupling the first inductor and the second inductor through a magnetic material in an electrically inverse manner.

In one embodiment, the control method further includes: configuring a single inductor to simultaneously serve as both the first inductor and the second inductor.

In one embodiment, the control method further includes adjusting the duty cycle of the plural switching signals according to a conversion ratio.

In one embodiment, the control method further includes: alternating the order in which the first front capacitor and the second front capacitor are electrically connected in series between the first power node and the ground potential based on a specific period to achieve charge balance.

In one embodiment, the switching frequency is related to a resonant frequency, enabling the multi-phase conversion circuit to operate in a resonant mode, controlling the voltage ratio of the second voltage to the first voltage related to the voltage ratio of the first voltage to either the first or the second divided voltage of the first voltage, wherein the resonant frequency relates to the capacitance of the first front capacitor and/or the first rear capacitor with the inductance of the first inductor, or the capacitance of the second front capacitor and/or the second rear capacitor with the inductance of the second inductor.

In one embodiment, the switching frequency is significantly higher than a resonant frequency to an extent, enabling the multi-phase conversion circuit to operate in a non-resonant mode, thereby regulating the second voltage to a predetermined level, or regulating the first voltage to a predetermined level, wherein the resonant frequency is related to the capacitance of the first front capacitor and/or the first rear capacitor with the inductance of the first inductor, or the capacitance of the second front capacitor and/or the second rear capacitor with the inductance of the second inductor.

The advantage of the present invention lies in achieving low voltage stress, reduced component count, support for more voltage conversion ratios, support for resonant and regulated mode operations, and featuring soft-switching resonant operation to reduce power consumption.

The objectives, technical details, features, and effects of the present invention will be better understood with regard to the detailed description of the embodiments below, with reference to the attached drawings.

BRIEF DESCRIPTION OF THE DRAWINGS

FIGS. 8A to 8C show lists of different switching states for FIGS. 7A to 7P according to an embodiment of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
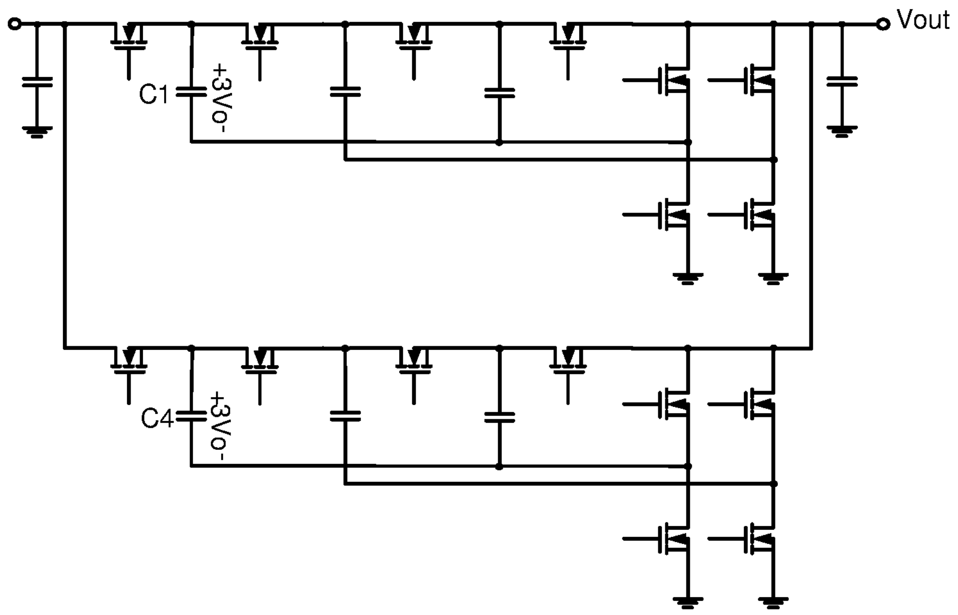
Fig. 1 (Prior Art)
FIG. 1 shows a schematic diagram of a known dual-phase conversion circuit.
Figure 2A:
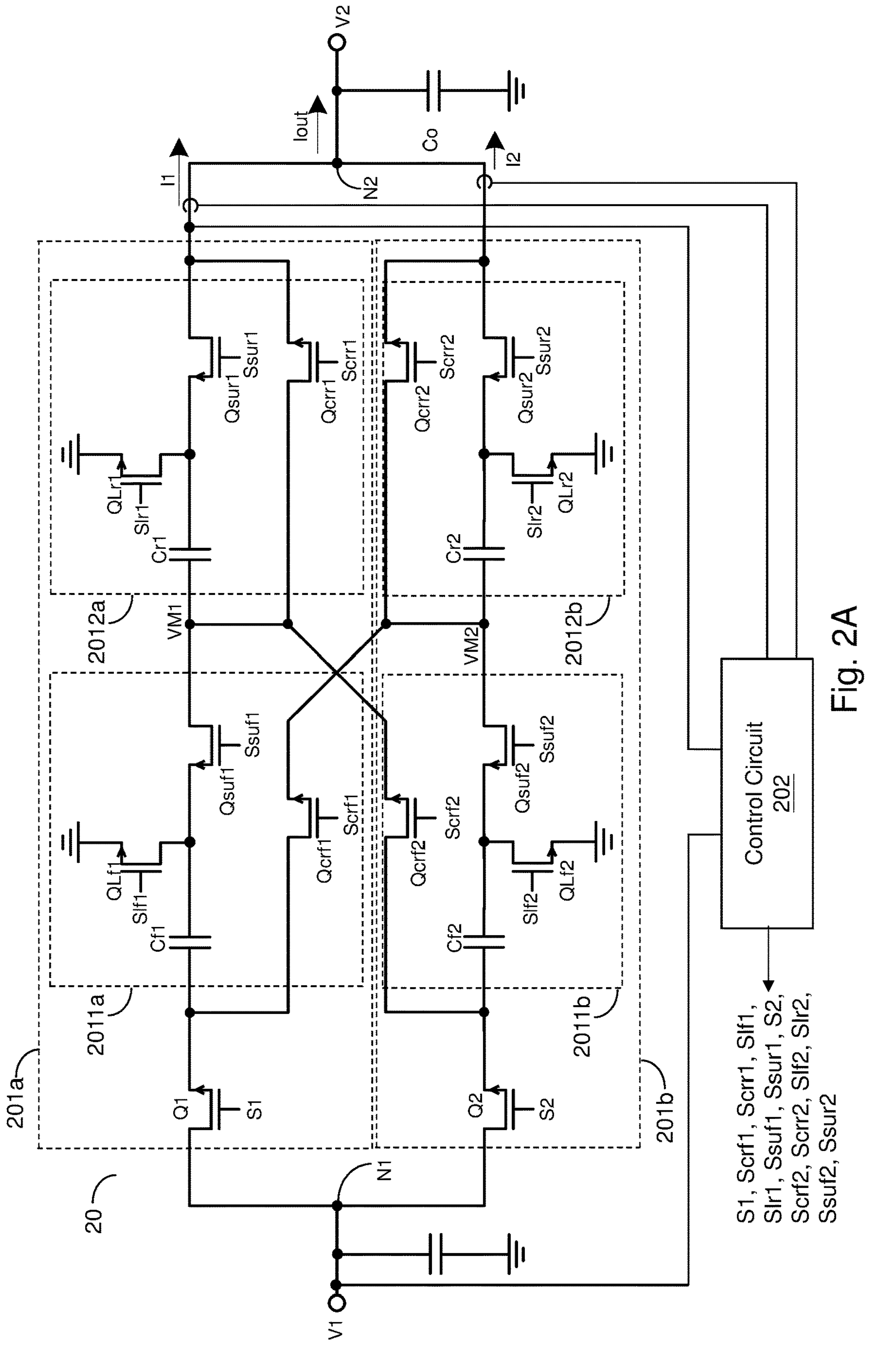
FIG. 2A shows a schematic diagram of a multi-phase conversion circuit according to an embodiment of the present invention.

FIG. 2A shows a circuit schematic of a multi-phase conversion circuit according to an embodiment of the present invention. As shown in FIG. 2A, the multi-phase conversion circuit 20 of the present invention is configured to perform power conversion between the first voltage V1 at the first power node N1 and the second voltage V2 at the second power node N2. Referring to FIG. 2A, the multi-phase conversion circuit 20 includes a first sub-conversion circuit 201*a*, a second sub-conversion circuit 201*b*, and a control circuit 202. The first sub-conversion circuit 201*a* includes a switch Q1, a front switched capacitor conversion circuit 2011*a*, and a rear switched capacitor conversion circuit 2012*a*. The switch Q1 is coupled to the first power node N1. The front switched capacitor conversion circuit 2011*a* is coupled between the switch Q1 and the first switching node VM1, and the rear switched capacitor conversion circuit 2012*a* is coupled between the first switching node VM1 and the second power node N2. The switch Q1, the front switched capacitor conversion circuit 2011*a*, and the rear switched capacitor conversion circuit 2012*a* are sequentially and serially connected between the first power node N1 and the second power node N2.

As shown in FIG. 2A, the front switched capacitor conversion circuit 2011*a* includes a front bridging switch Qcrf1, a front low-side switch QLf1, a front subordinate switch Qsuf1, and a front capacitor Cf1. The rear switched capacitor conversion circuit 2012*a* includes a rear bridging switch Qcrr1, a rear low-side switch QLr1, a rear subordinate switch Qsur1, and a rear capacitor Cr1. The second sub-conversion circuit 201*b* includes a switch Q2, a front switched capacitor conversion circuit 2011*b*, and a rear switched capacitor conversion circuit 2012*b*. The switch Q2 is coupled to the first power node N1. The front switched capacitor conversion circuit 2011*b* is coupled between the switch Q2 and the second switching node VM2, and the rear switched capacitor conversion circuit 2012*b* is coupled between the second switching node VM2 and the second power node N2. The switch Q2, the front switched capacitor conversion circuit 2011*b*, and the rear switched capacitor conversion circuit 2012*b* are sequentially and serially connected between the first power node N1 and the second power node N2. The output capacitor Co is coupled between the second power node N2 and the ground potential.

The front switched capacitor conversion circuit 2011*b* includes a front bridging switch Qcrf2, a front low-side switch QLf2, a front subordinate switch Qsuf2, and a front capacitor Cf2. The rear switched capacitor conversion circuit 2012*b* includes a rear bridging switch Qcrr2, a rear low-side switch QLr2, a rear subordinate switch Qsur2, and a rear capacitor Cr2.

The control circuit 202 is configured to generate plural switching signals S1, Scrf1, Scrr1, SLf1, SLr1, Ssuf1, Ssur1, S2, Scrf2, Scrr2, SLf2, SLr2, Ssuf2, and Ssur2. The first sub-conversion circuit 201*a* and the second sub-conversion circuit 201*b* are configured to switch the electrical connections of the front capacitors Cf1, rear capacitors Cr1, front capacitors Cf2, and/or rear capacitors Cr2 between plural electrical connection states according to the plural switching signals S1, Scrf1, Scrr1, SLf1, SLr1, Ssuf1, Ssur1, S2, Scrf2, Scrr2, SLf2, SLr2, Ssuf2, and Ssur2 at a switching frequency.

The plural switching signals S1, Scrf1, Scrr1, SLf1, SLr1, Ssuf1, Ssur1, S2, Scrf2, Scrr2, SLf2, SLr2, Ssuf2, and Ssur2 operate the front capacitors Cf1, rear capacitors Cr1, front capacitors Cf2, and/or rear capacitors Cr2, between plural electrical connection states, to perform switched-capacitor voltage division for the first voltage V1, so as to switch the first switching node VM1 between the first divided voltage of the first voltage V1 obtained by the switched-capacitor voltage division and the first reference potential, and to switch the second switching node VM2 between the second divided voltage of the first voltage V1 obtained by the switched-capacitor voltage division and the second reference potential, thereby performing power conversion between the first power node N1 and the second power node N2.

The first reference potential and the second reference potential are each related to the first voltage V1 or its division, ground potential, the across-voltage of the front capacitor Cf1, the across-voltage of the rear capacitor Cr1, the across-voltage of the front capacitor Cf2, and/or the across-voltage of the rear capacitor Cr2. The front subordinate switch Qsuf1 is coupled between the front capacitor Cf1 and the first switching node VM1, configured to decide whether the front capacitor Cf1 is electrically connected to the first switching node VM1 according to the corresponding switching signal Ssuf1. The rear subordinate switch Qsur1 is coupled between the rear capacitor Cr1 and the second power node N2, configured to decide whether the rear capacitor Cr1 is electrically connected to the second power node N2 according to the corresponding switching signal Ssur1.

The front subordinate switch Qsuf2 is coupled between the front capacitor Cf2 and the second switching node VM2, configured to decide whether the front capacitor Cf2 is electrically connected to the second switching node VM2 according to the corresponding switching signal Ssuf2. The rear subordinate switch Qsur2 is coupled between the rear capacitor Cr2 and the second power node N2, configured to decide whether the rear capacitor Cr2 is electrically connected to the second power node N2 according to the corresponding switching signal Ssur2. The order in which the front capacitors Cf1 and Cf2 are electrically connected in series between the first power node N1 and the ground potential alternates based on a specific period to achieve charge balance. Specifically, in one period, the front capacitors Cf1 and Cf2, controlled by the aforementioned plural switches, are sequentially coupled in series between the first power node N1 and ground. In another period, the sequence is reversed, with the front capacitors Cf2 and Cf1, again controlled by the plural switches, coupled in series between the first power node N1 and ground.

Figure 2B:
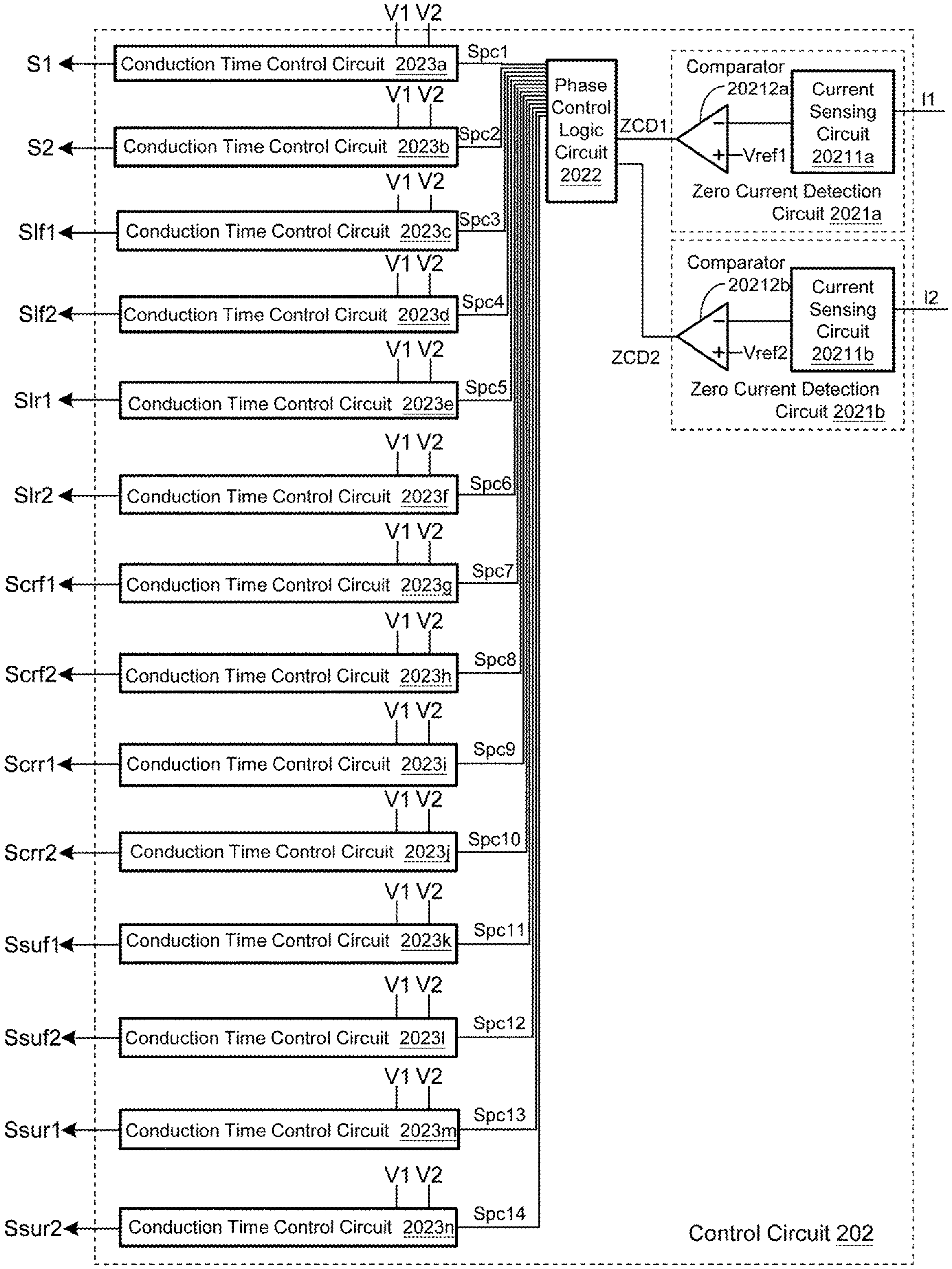
FIG. 2B shows a schematic diagram of a control circuit for a multi-phase conversion circuit according to an embodiment of the present invention.

FIG. 2B shows a circuit schematic of the control circuit of the multi-phase conversion circuit according to an embodiment of the present invention. As shown in FIG. 2B, the control circuit 202 generates switching signals S1, S2, SLf1, SLf2, SLr1, SLr2, Scrf1, Scrf2, Scrr1, Scrr2, Ssuf1, Ssuf2, Ssur1, Ssur2 according to the first voltage V1, the second voltage V2, current I1, current I2, and the load level (i.e., the power consumption or current of the load circuit) to switch the electrical connection states. The control circuit 202 includes zero current detection circuits 2021*a*, 2021*b*, phase control logic circuit 2022, and conduction time control circuits 2023*a*~2023*n*.

The zero current detection circuit 2021*a* is coupled between the phase control logic circuit 2022 and the second voltage V2 for detecting the current I1. The zero current detection circuit 2021*b* is coupled between the phase control logic circuit 2022 and the second voltage V2 for detecting the current I2. When the zero current detection circuit 2021*a* detects that the current I1 is zero, it generates a zero current detection signal ZCD1 to the phase control logic circuit 2022. Similarly, when the zero current detection circuit 2021*b* detects that the current I2 is zero, it generates a zero current detection signal ZCD2 to the phase control logic circuit 2022. In this embodiment, the zero current detection circuits 2021*a* and 2021*b* respectively include current sensing circuits 20211*a* and 20211*b* for sensing the currents I1 and I2, respectively. The zero current detection circuits 2021*a* and 2021*b* further include comparators 20212*a* and 20212*b*, respectively, for comparing the sensed currents I1 and I2 with reference signals Vref1 and Vref2, respectively, to generate the zero current detection signals ZCD1 and ZCD2.

The phase control logic circuit 2022 generates phase control signals Spc1 to Spc14 according to the first voltage V1, the second voltage V2, and the zero current detection signals ZCD1 and/or ZCD2. The conduction time control circuits 2023*a* to 2023*n* generate switching signals S1, S2, SLf1, SLf2, SLr1, SLr2, Scrf1, Scrf2, Scrr1, Scrr2, Ssuf1, Ssuf2, Ssur1, and Ssur2 according to the phase control signals Spc1 to Spc14 and the first and second voltages V1 and V2.

Figure 2C:
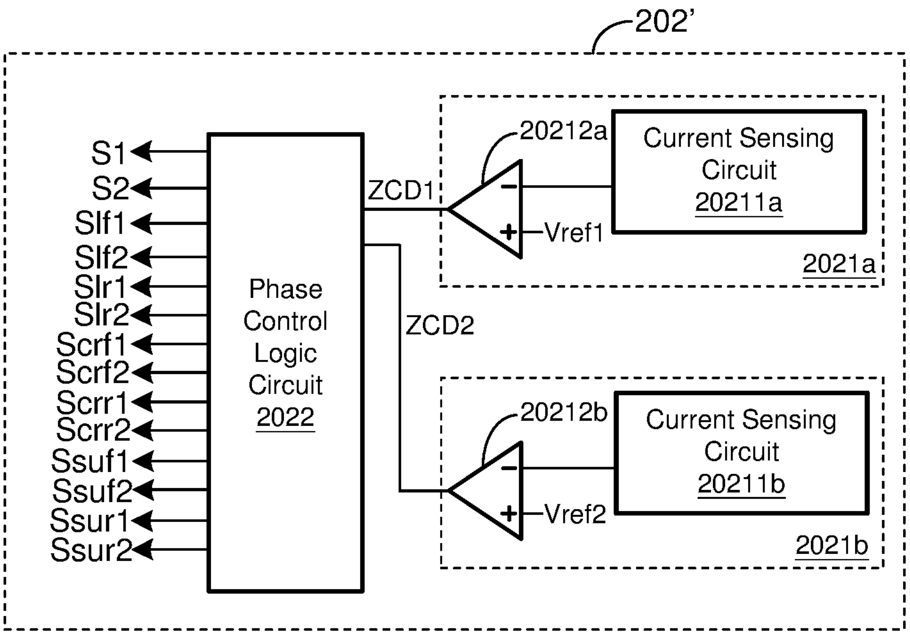
FIG. 2C shows a schematic diagram of a control circuit for a multi-phase conversion circuit according to another embodiment of the present invention.

FIG. 2C shows a circuit schematic of the control circuit of the multi-phase conversion circuit according to another embodiment of the present invention. The control circuit 202' in this embodiment is similar to the control circuit 202 shown in FIG. 2B, with the difference being that the control circuit 202' omits the conduction time control circuits 2023*a* to 2023*n* and the phase control signals Spc1 to Spc14. In other words, the phase control logic circuit 2022 directly generates switching signals S1, S2, SLf1, SLf2, SLr1, SLr2, Scrf1, Scrf2, Scrr1, Scrr2, Ssuf1, Ssuf2, Ssur1, and Ssur2 according to the zero current detection signals ZCD1 or ZCD2.

Figure 3:
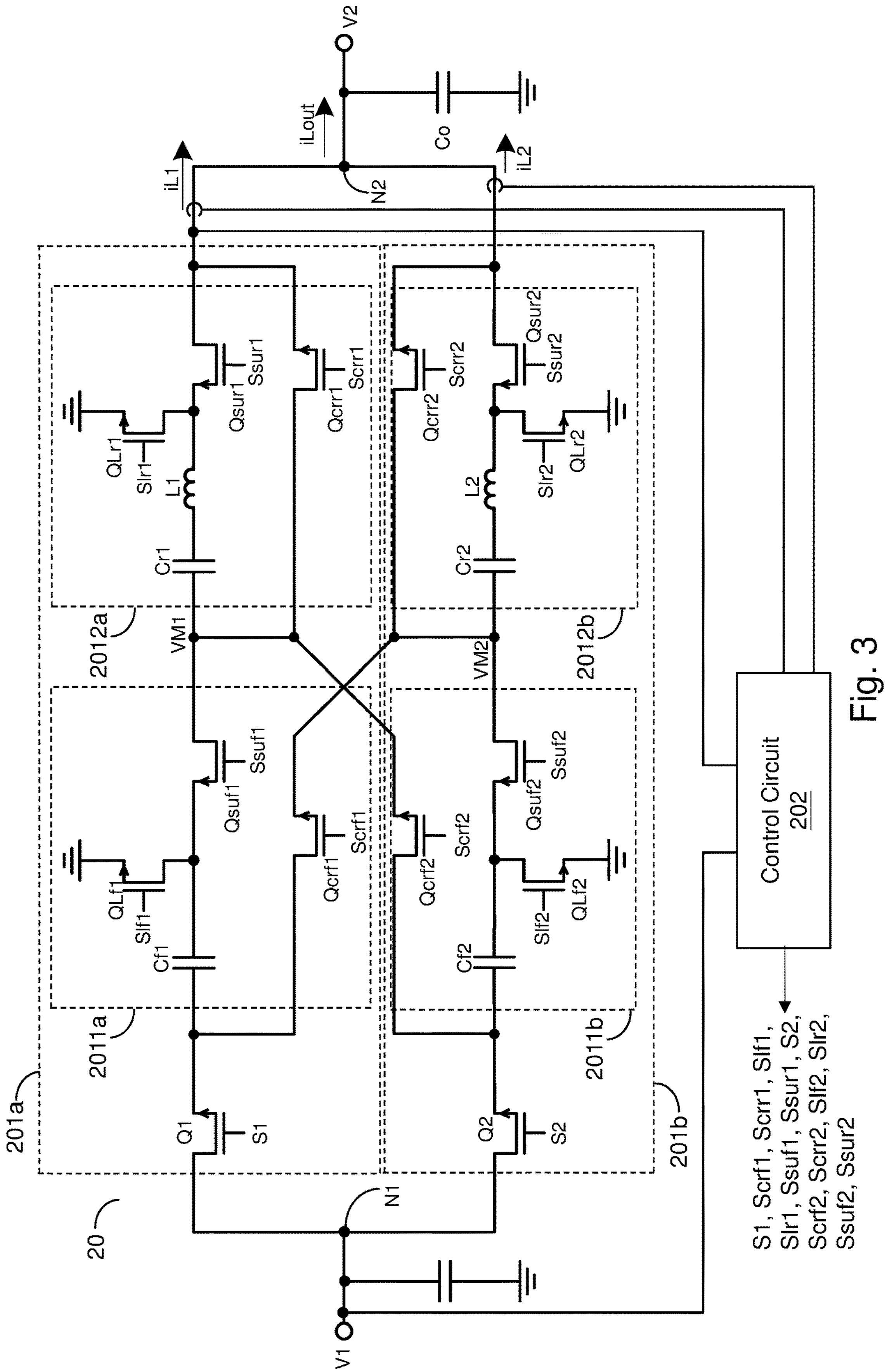
FIG. 3 shows a schematic diagram of a multi-phase conversion circuit according to another embodiment of the present invention.

FIG. 3 shows a circuit schematic of the multi-phase conversion circuit according to another embodiment of the present invention. The difference between this embodiment and the embodiment shown in FIG. 2A is that the first sub-conversion circuit 201*a* further includes an inductor L1, and the second sub-conversion circuit 201*b* further includes an inductor L2. As shown in FIG. 3, the inductor L1 is coupled between the rear capacitor Cr1 and the second power node N2, while the inductor L2 is coupled between the rear capacitor Cr2 and the second power node N2. More specifically, the inductor L1 is coupled between the rear capacitor Cr1 and the rear subordinate switch Qsur1, and the inductor L2 is coupled between the rear capacitor Cr2 and the rear subordinate switch Qsur2.

Figure 4:
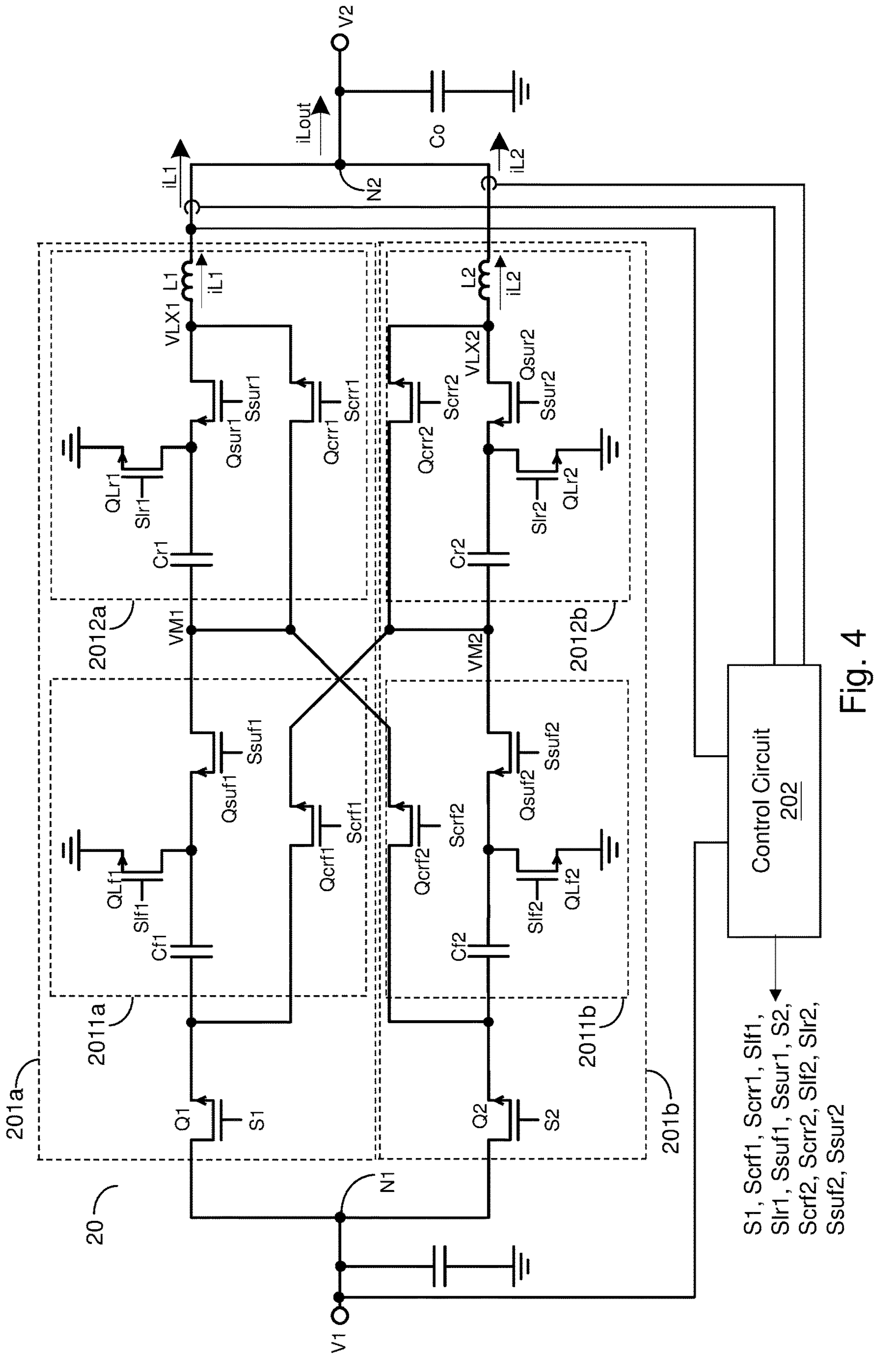
FIG. 4 shows a schematic diagram of a multi-phase conversion circuit according to a further embodiment of the present invention.

FIG. 4 shows a circuit schematic of the multi-phase conversion circuit according to yet another embodiment of the present invention. The difference between this embodiment and the embodiment shown in FIG. 3 is that the inductor L1 is coupled between the rear subordinate switch Qsur1 and the second power node N2, and the inductor L2 is coupled between the rear subordinate switch Qsur2 and the second power node N2.

Figure 5:
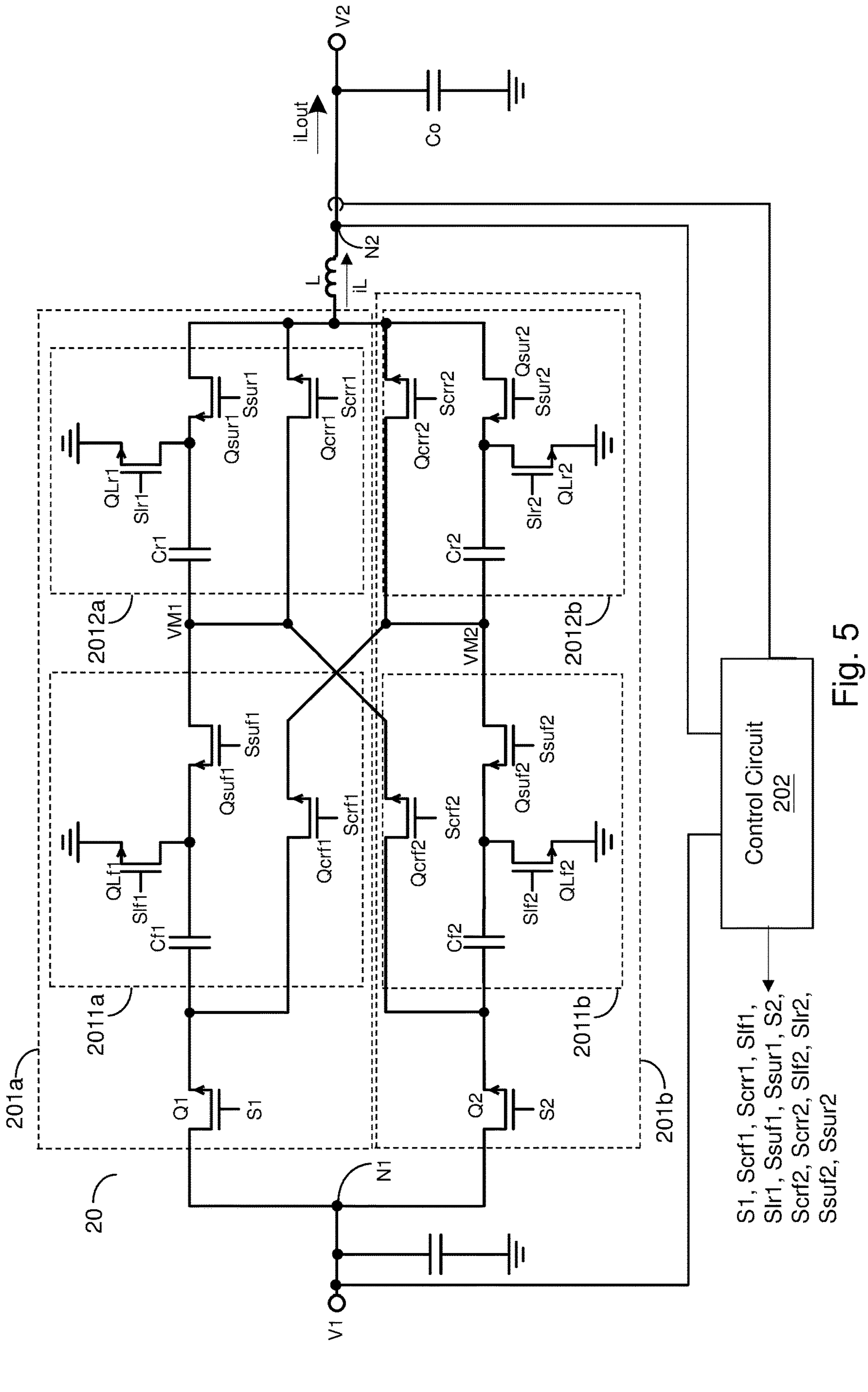
FIG. 5 shows a schematic diagram of a multi-phase conversion circuit according to yet another embodiment of the present invention.

FIG. 5 shows a circuit schematic of the multi-phase conversion circuit according to another embodiment of the present invention. The difference between this embodiment and the embodiment shown in FIG. 4 is that a single inductor L is used as both inductor L1 and inductor L2.

Figure 6:
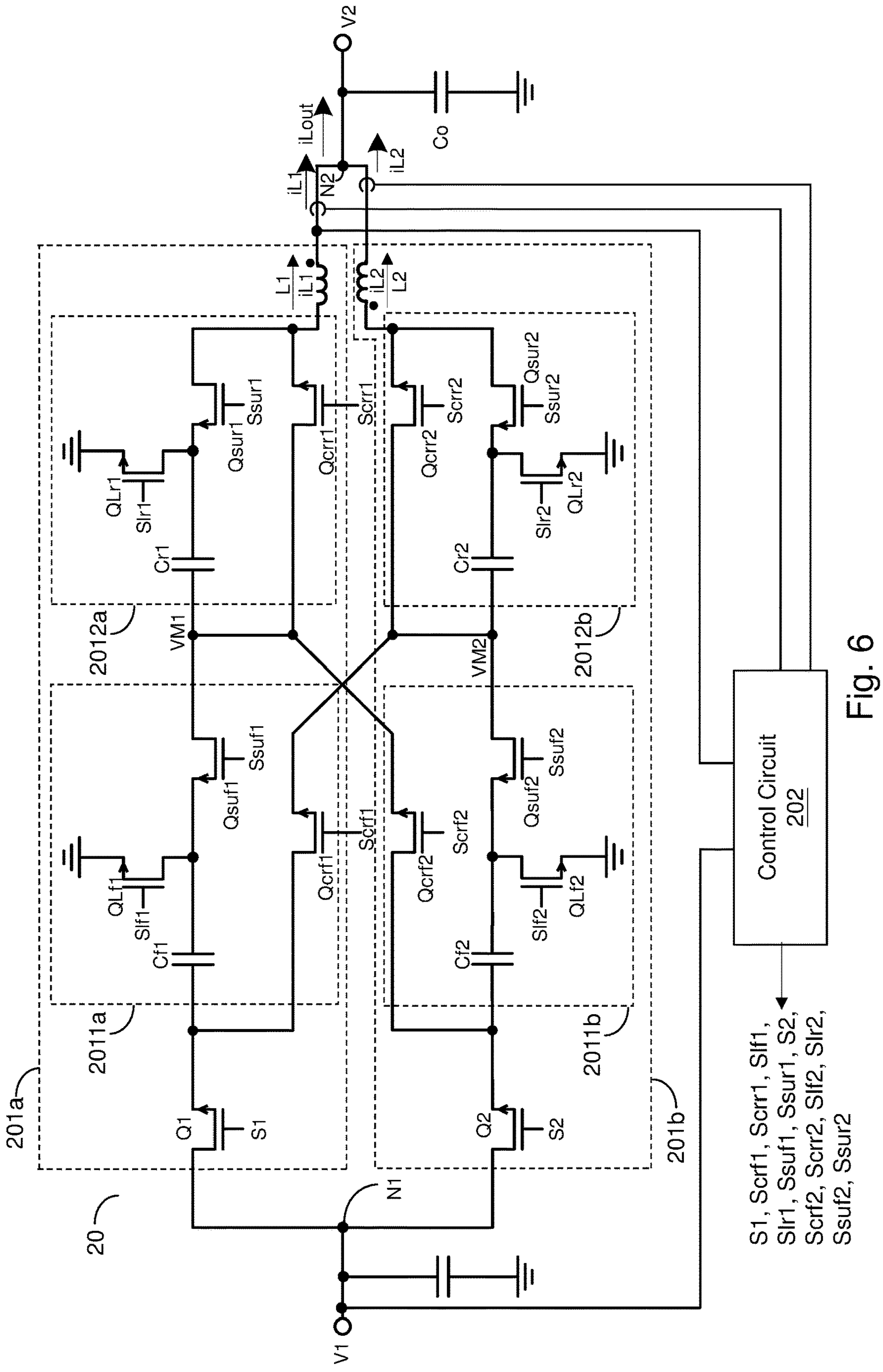
FIG. 6 shows a schematic diagram of a multi-phase conversion circuit according to a further embodiment of the present invention.

FIG. 6 shows a circuit schematic of the multi-phase conversion circuit according to another embodiment of the present invention. The difference between this embodiment and the embodiment shown in FIG. 4 is that inductors L1 and L2 are magnetically coupled in reverse electromagnetic coupling through a magnetic object.

Figure 7A:
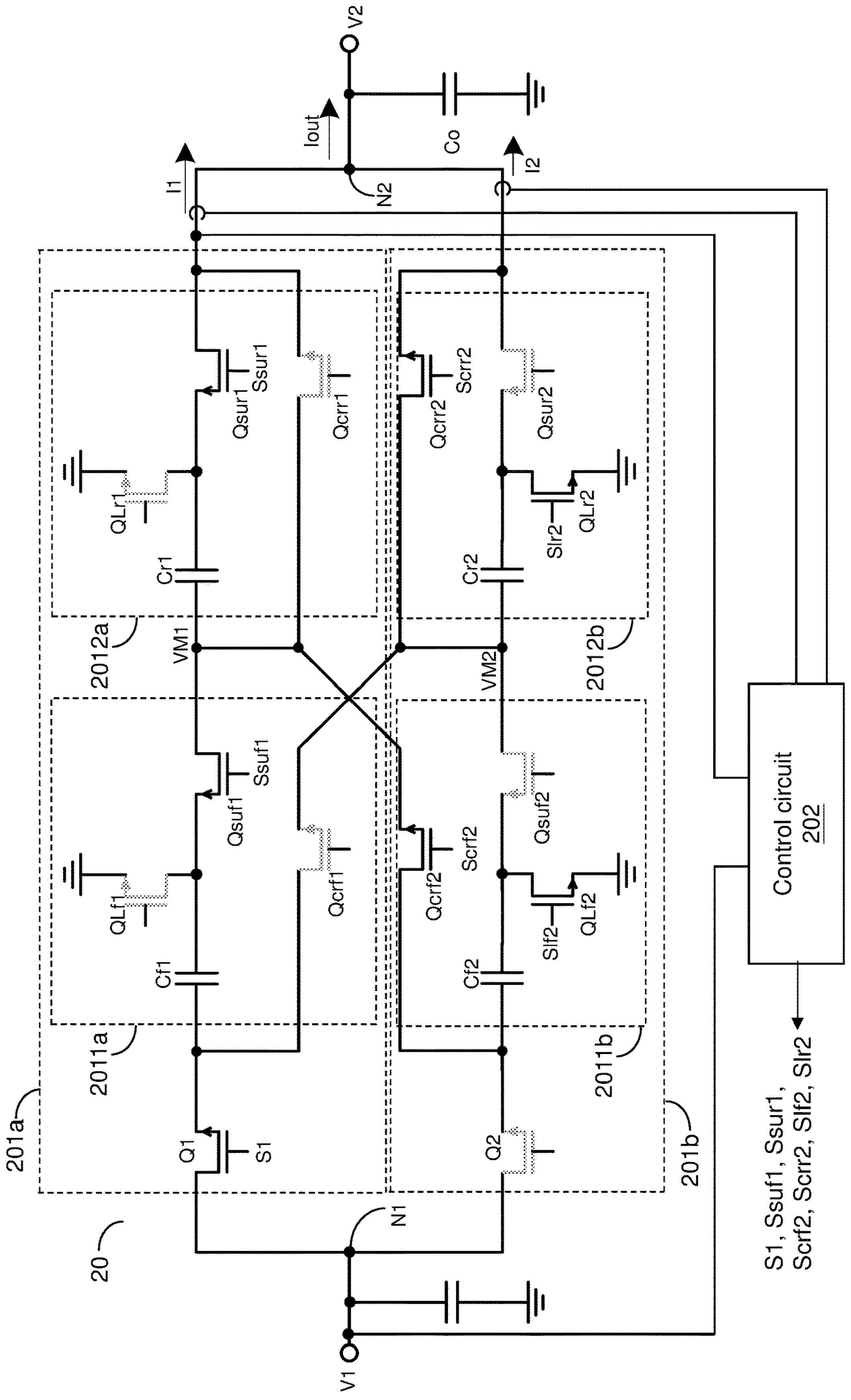
FIGS. 7A to 7P show schematic diagrams and operation diagrams of a multi-phase conversion circuit according to an embodiment of the present invention.
Figure 7B:
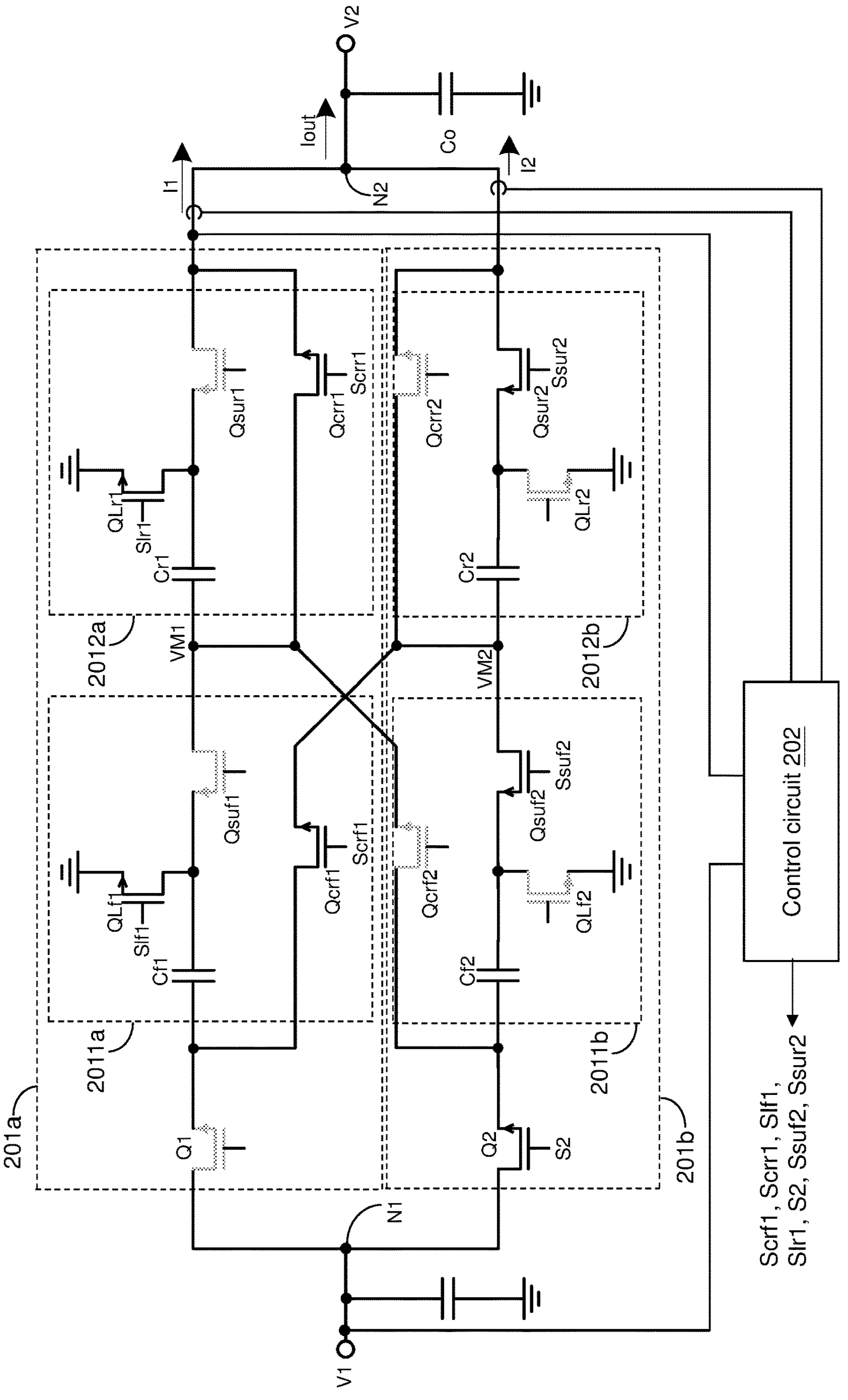
Figure 7C:
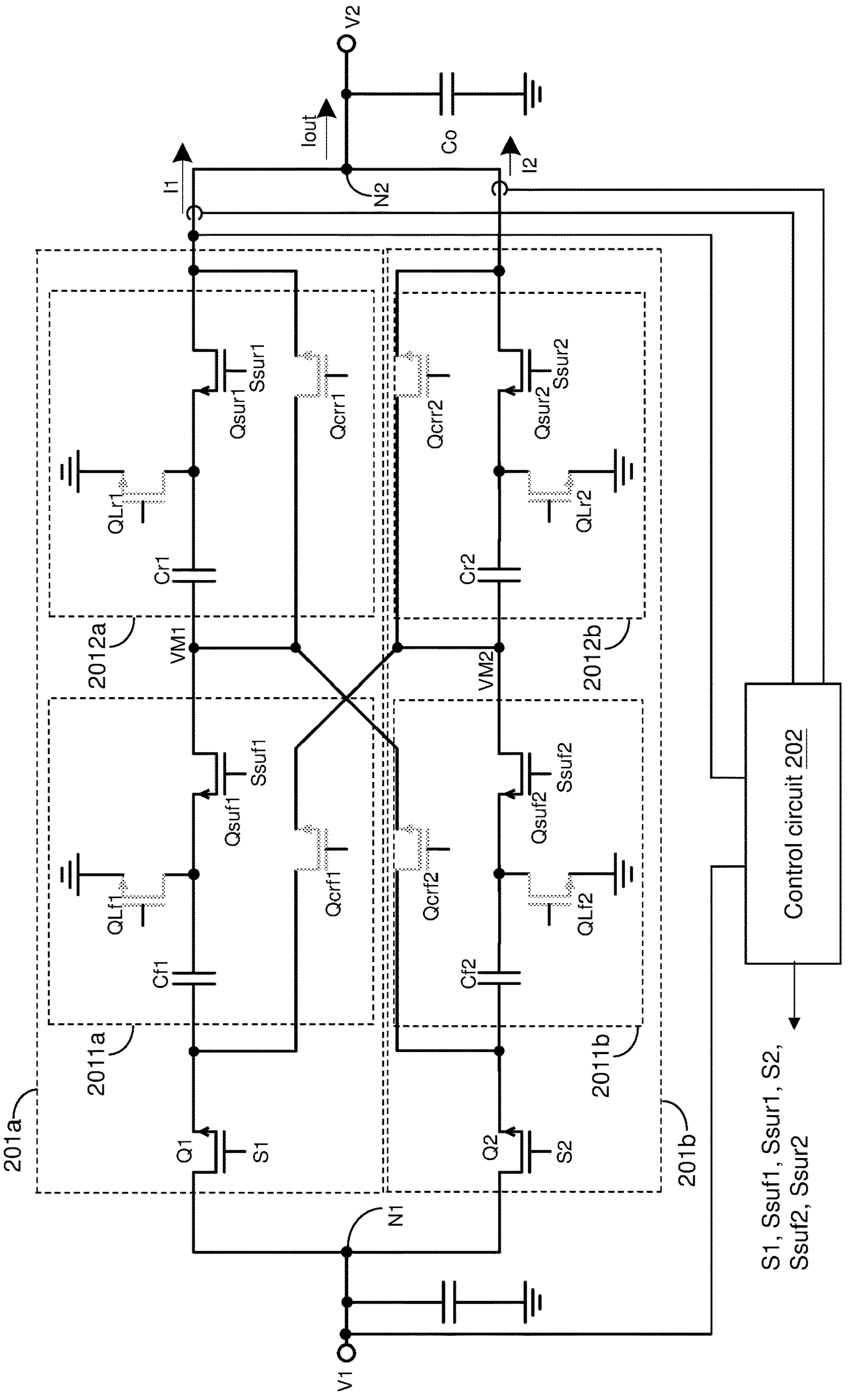
Figure 7D:
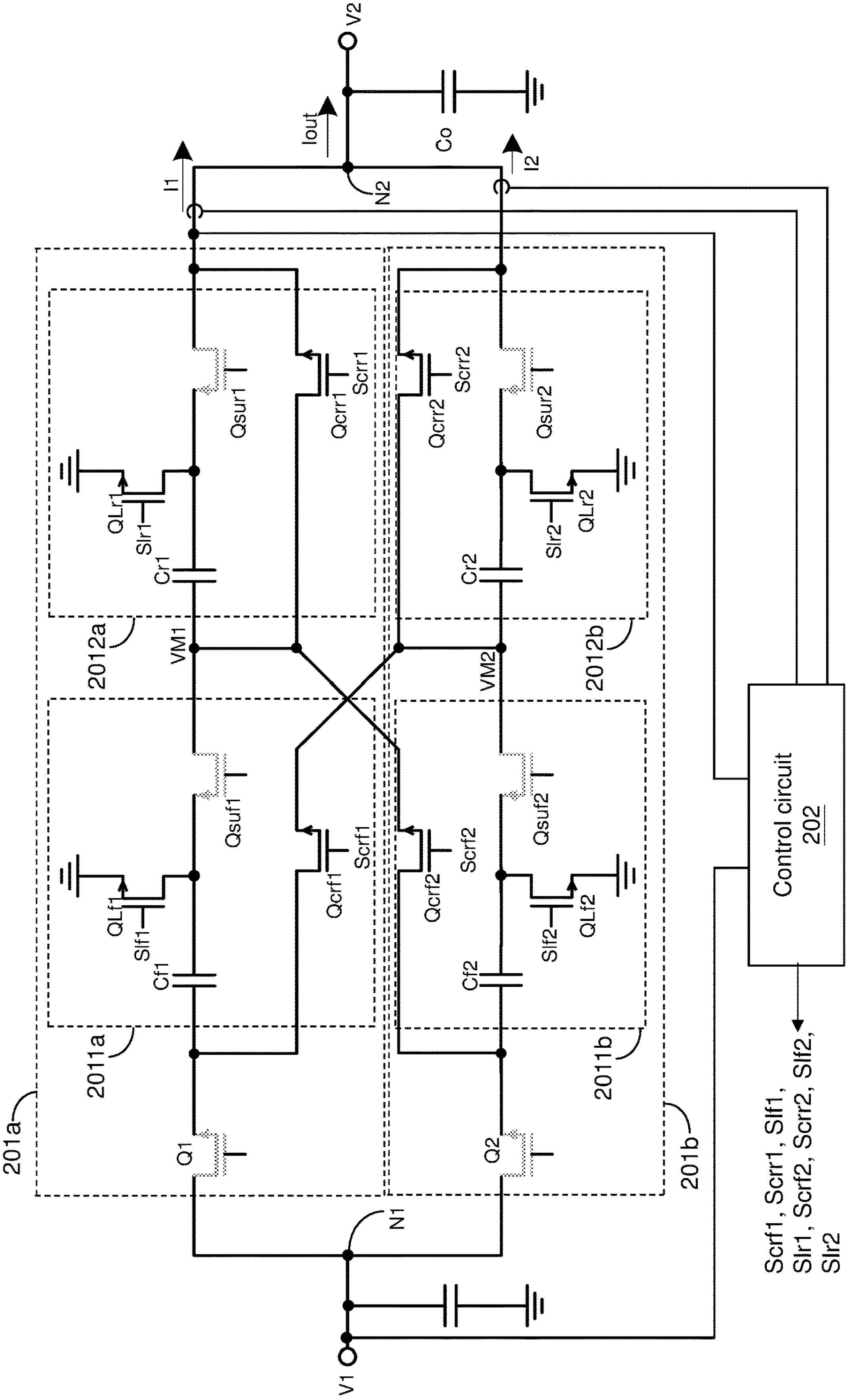
Figure 7E:
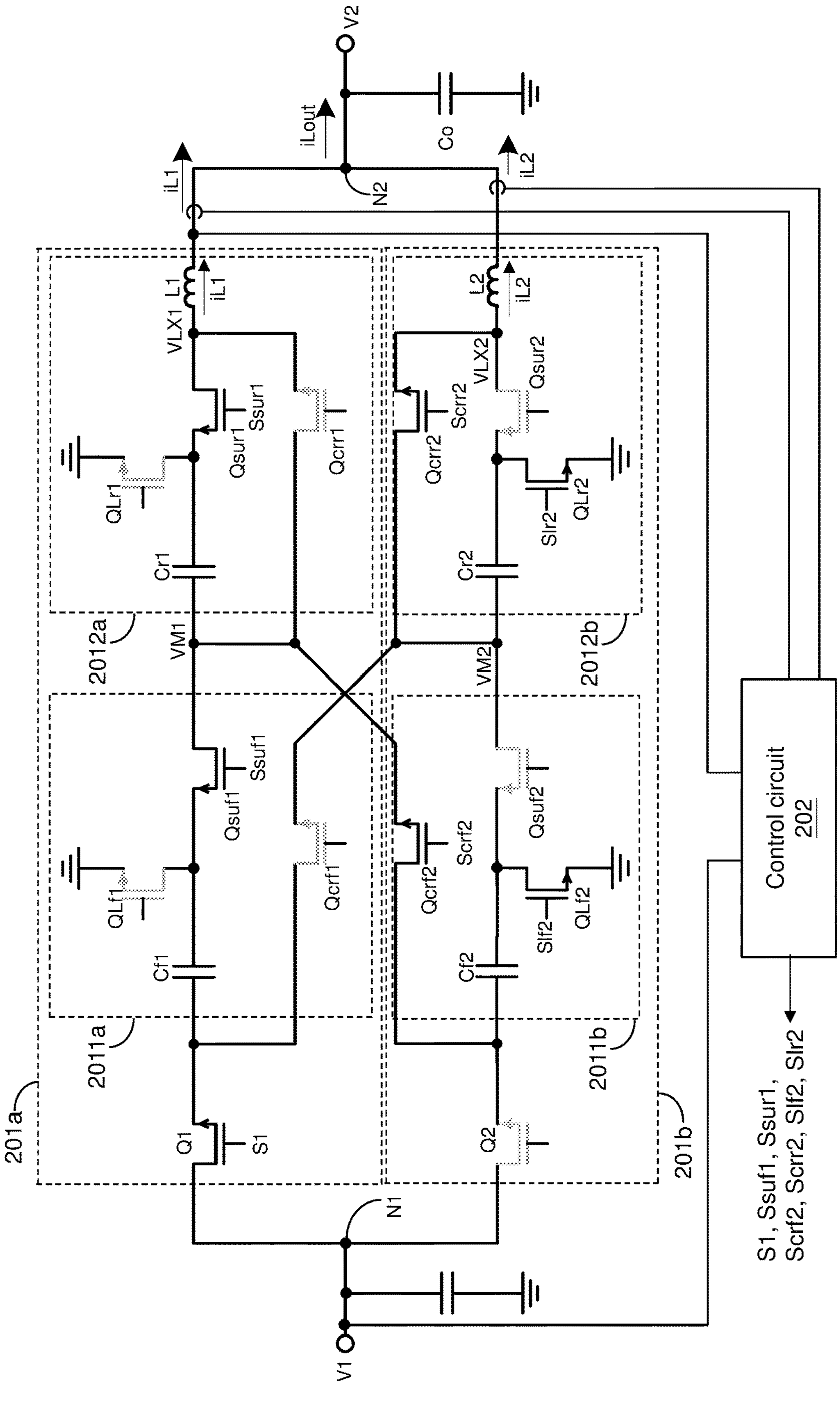
Figure 7F:
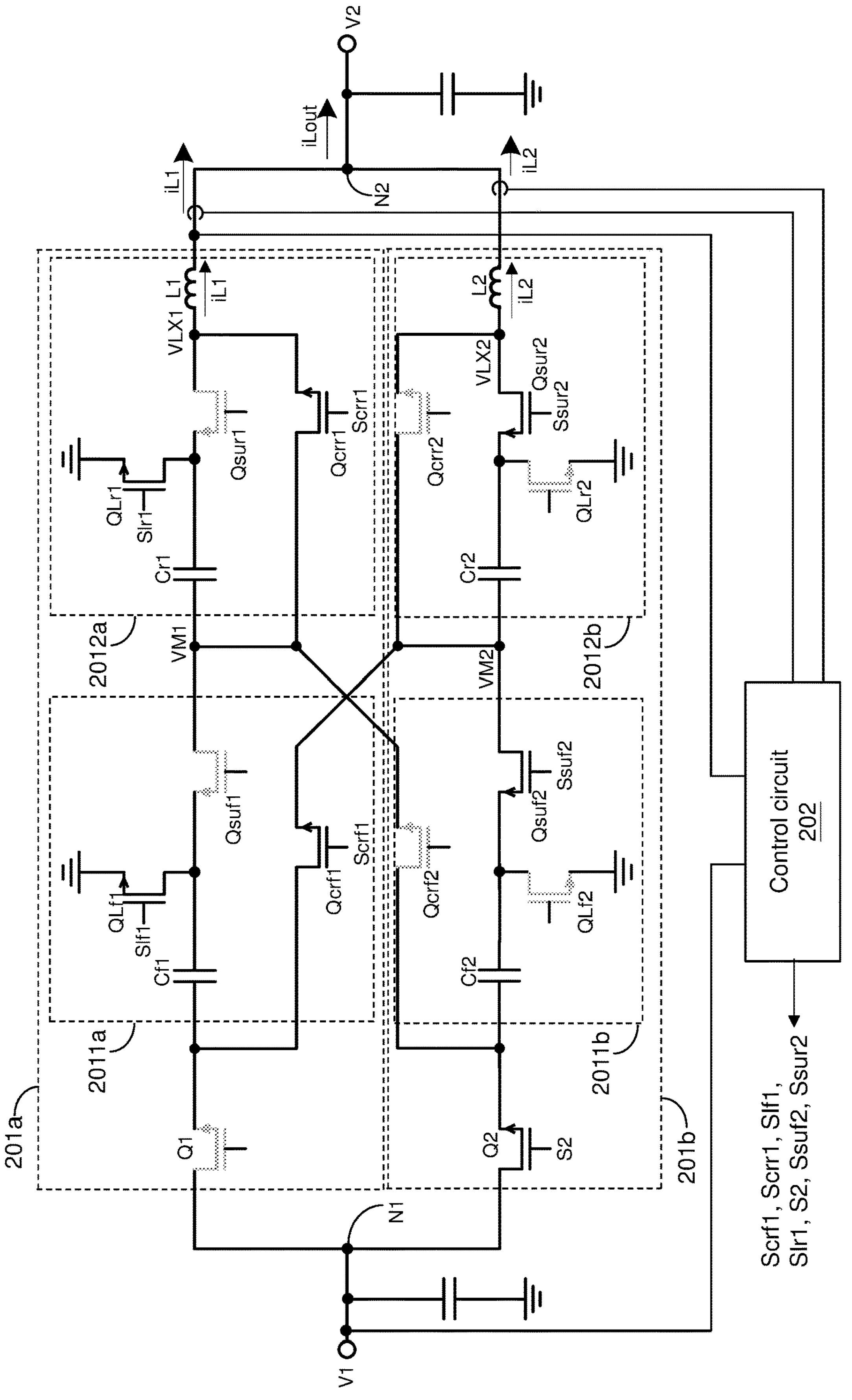
Figure 7G:
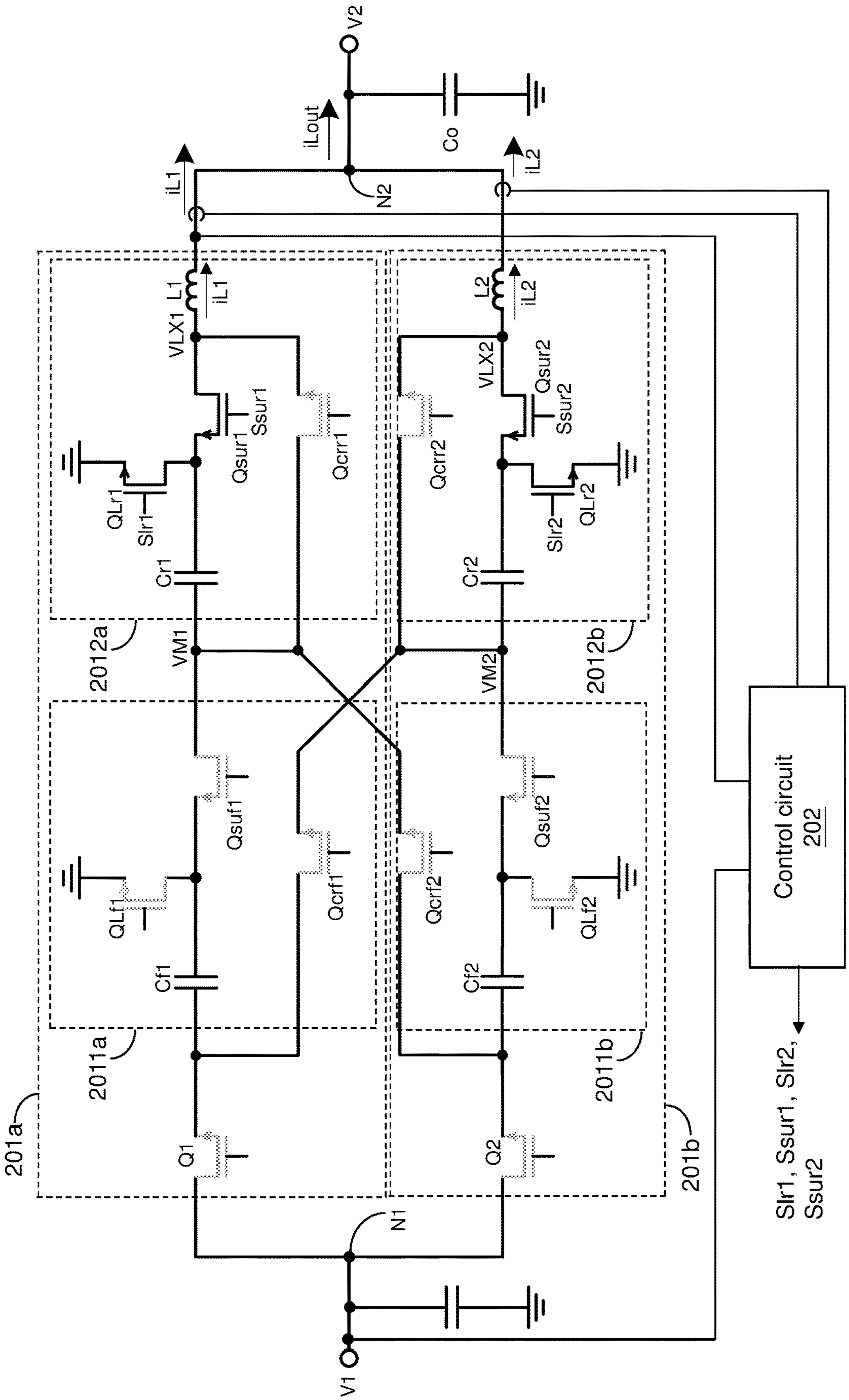
Figure 7H:
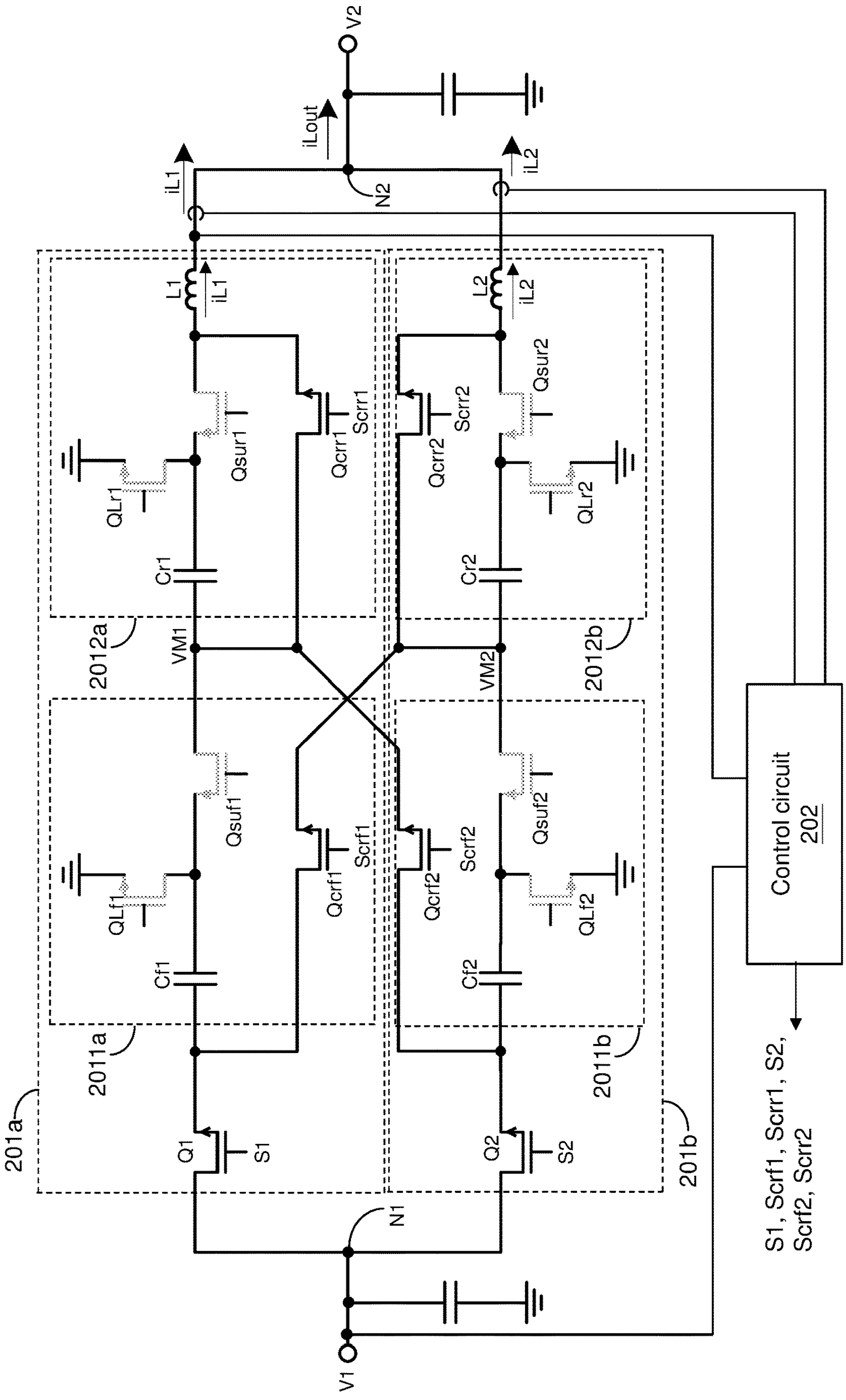
Figure 7I:
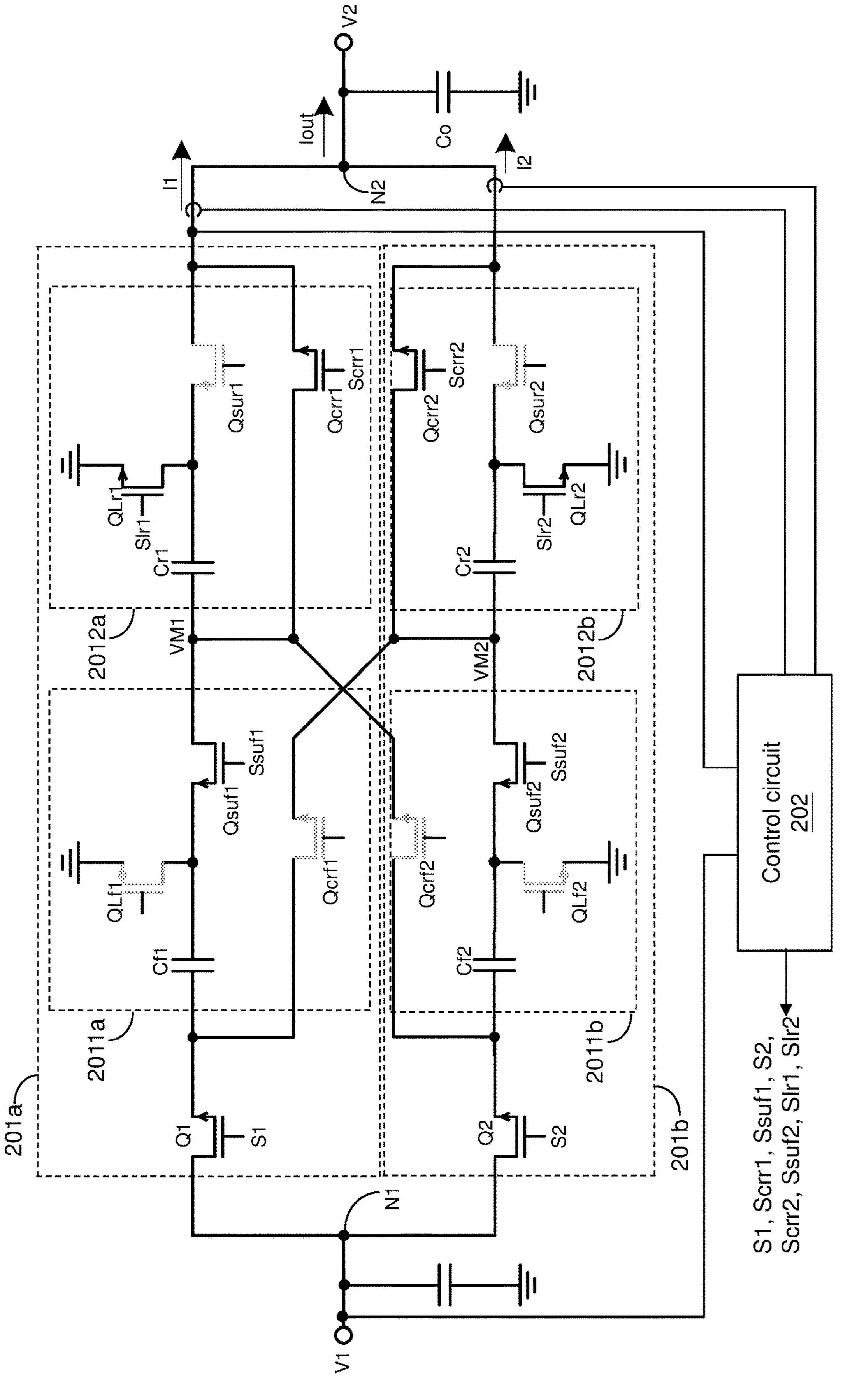
Figure 7J:
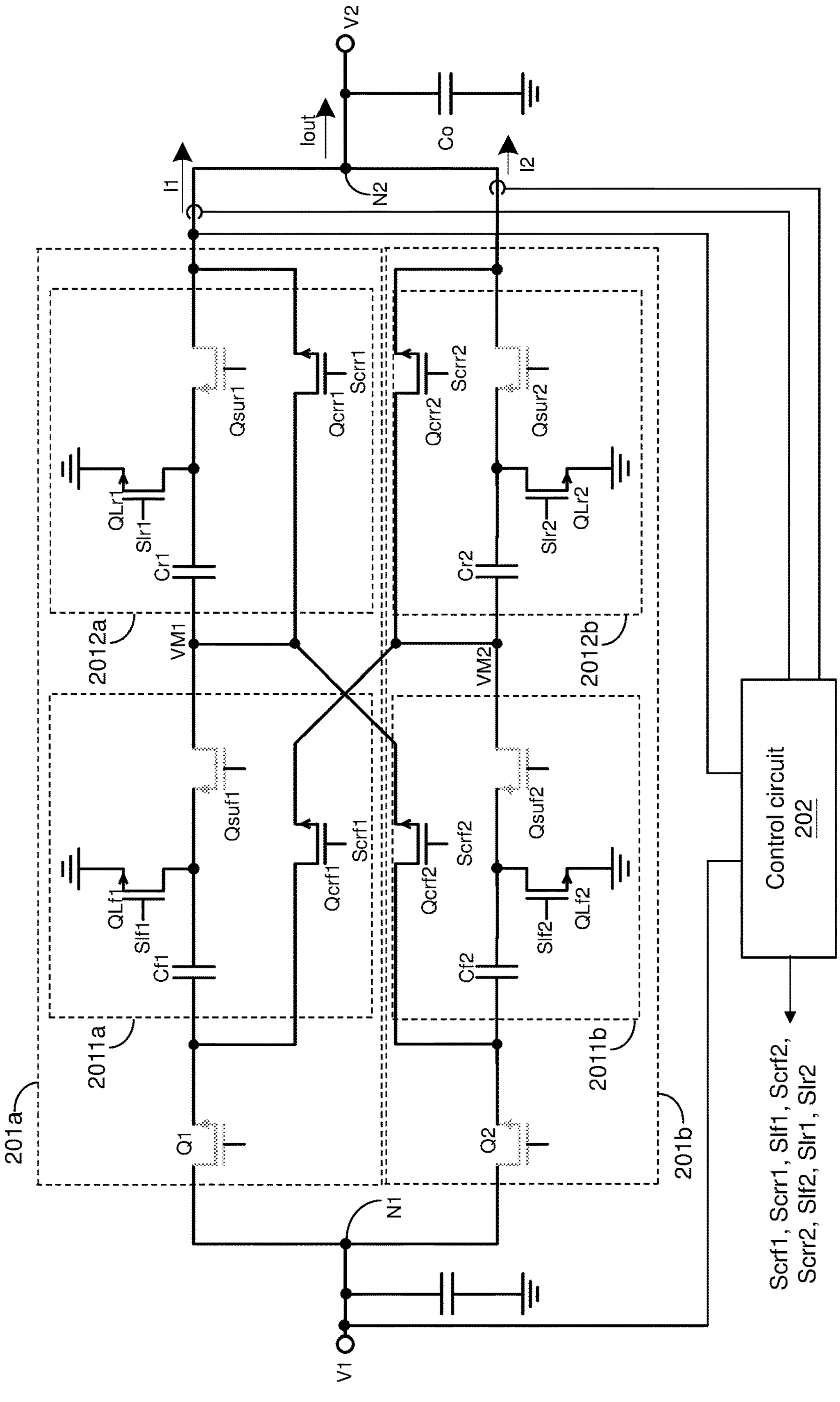
Figure 7K:
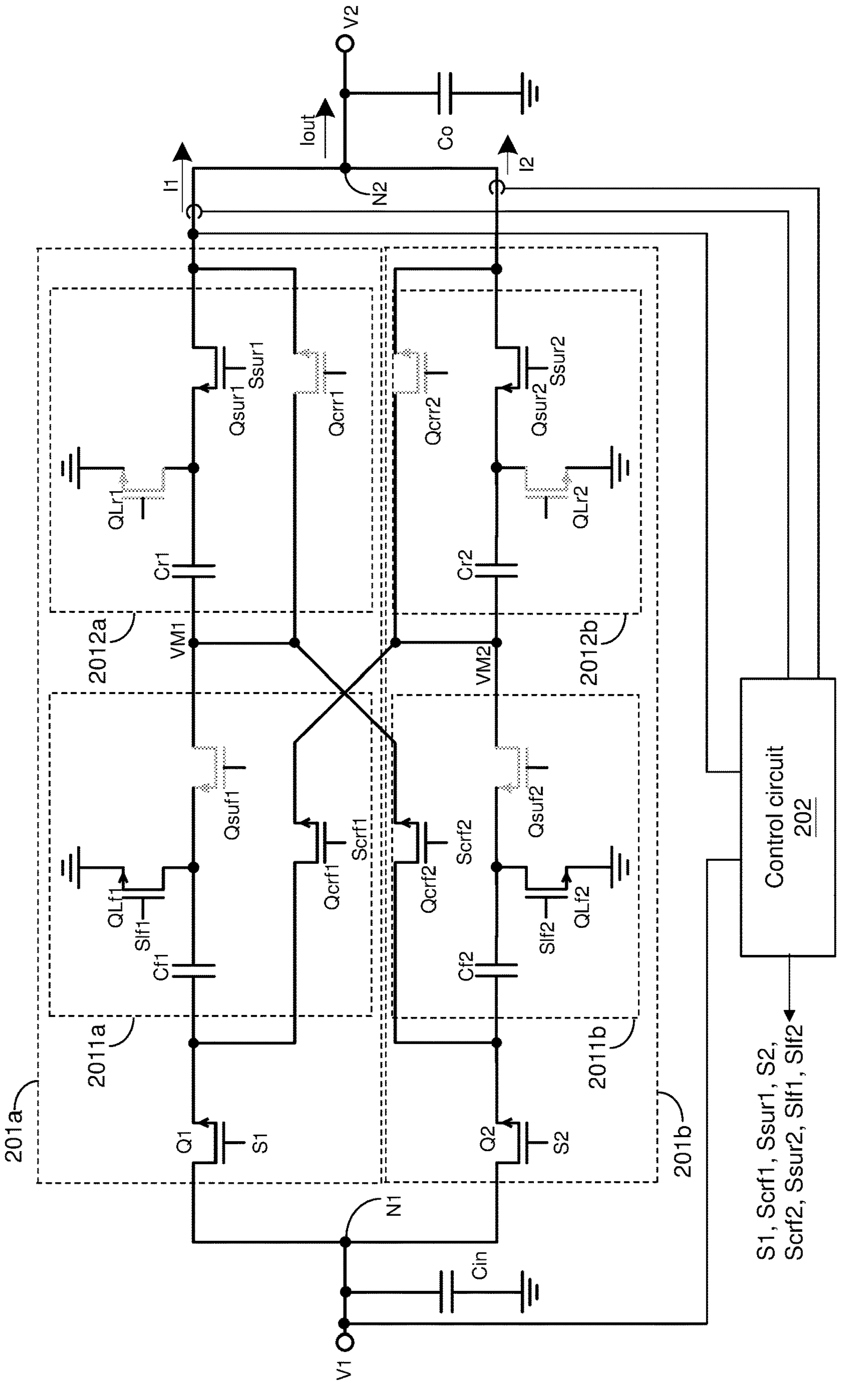
Figure 7L:
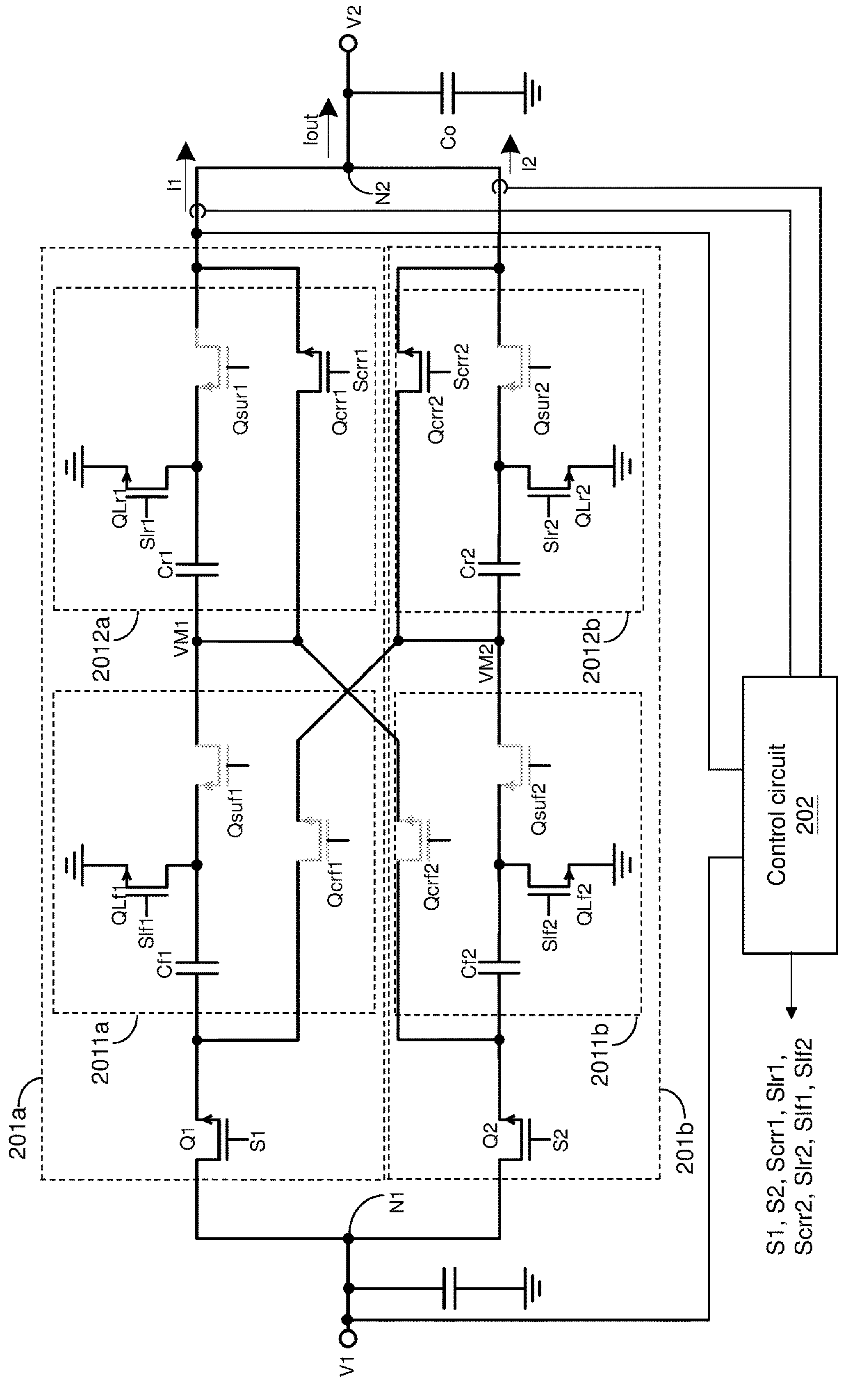
Figure 7M:
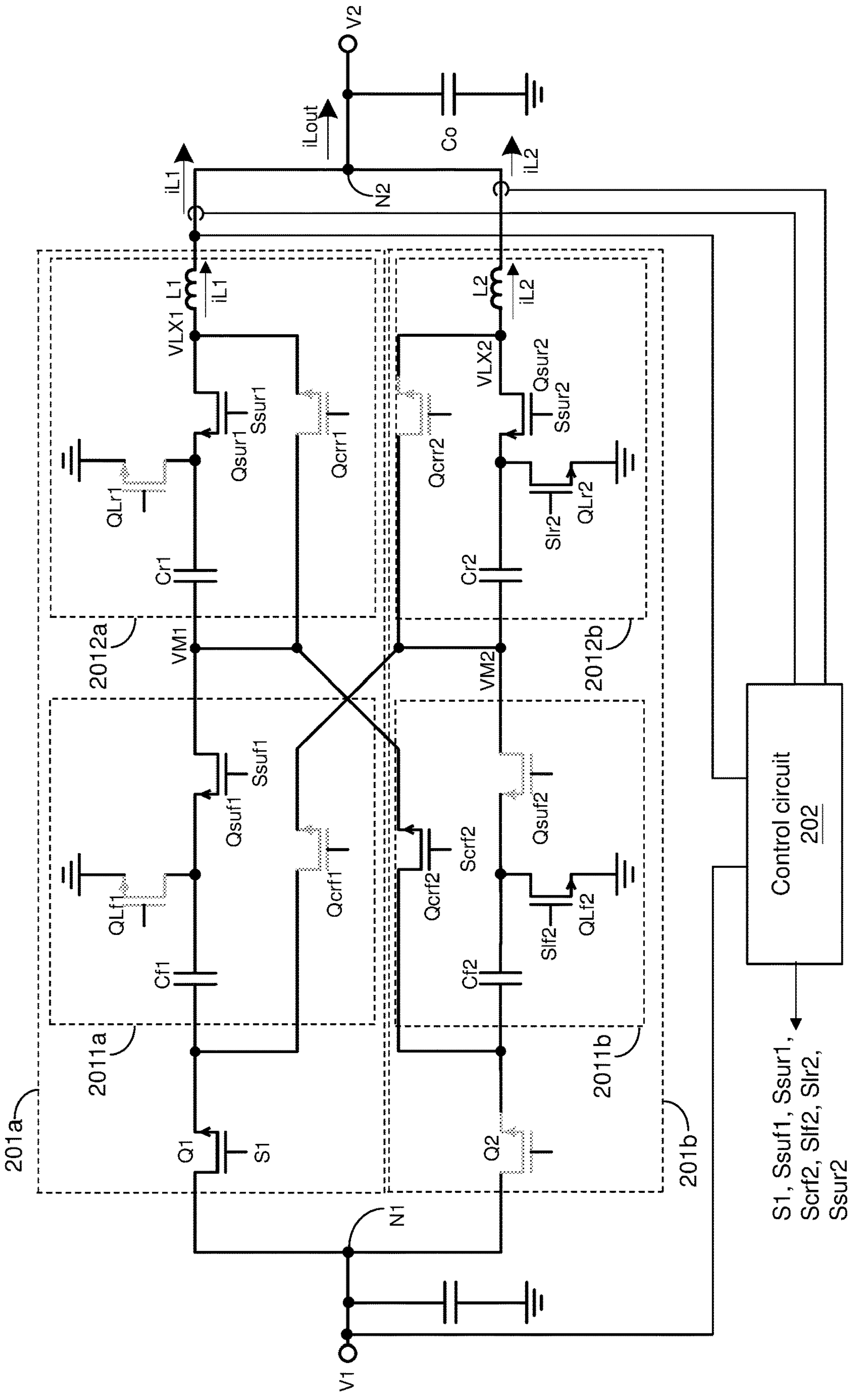
Figure 7N:
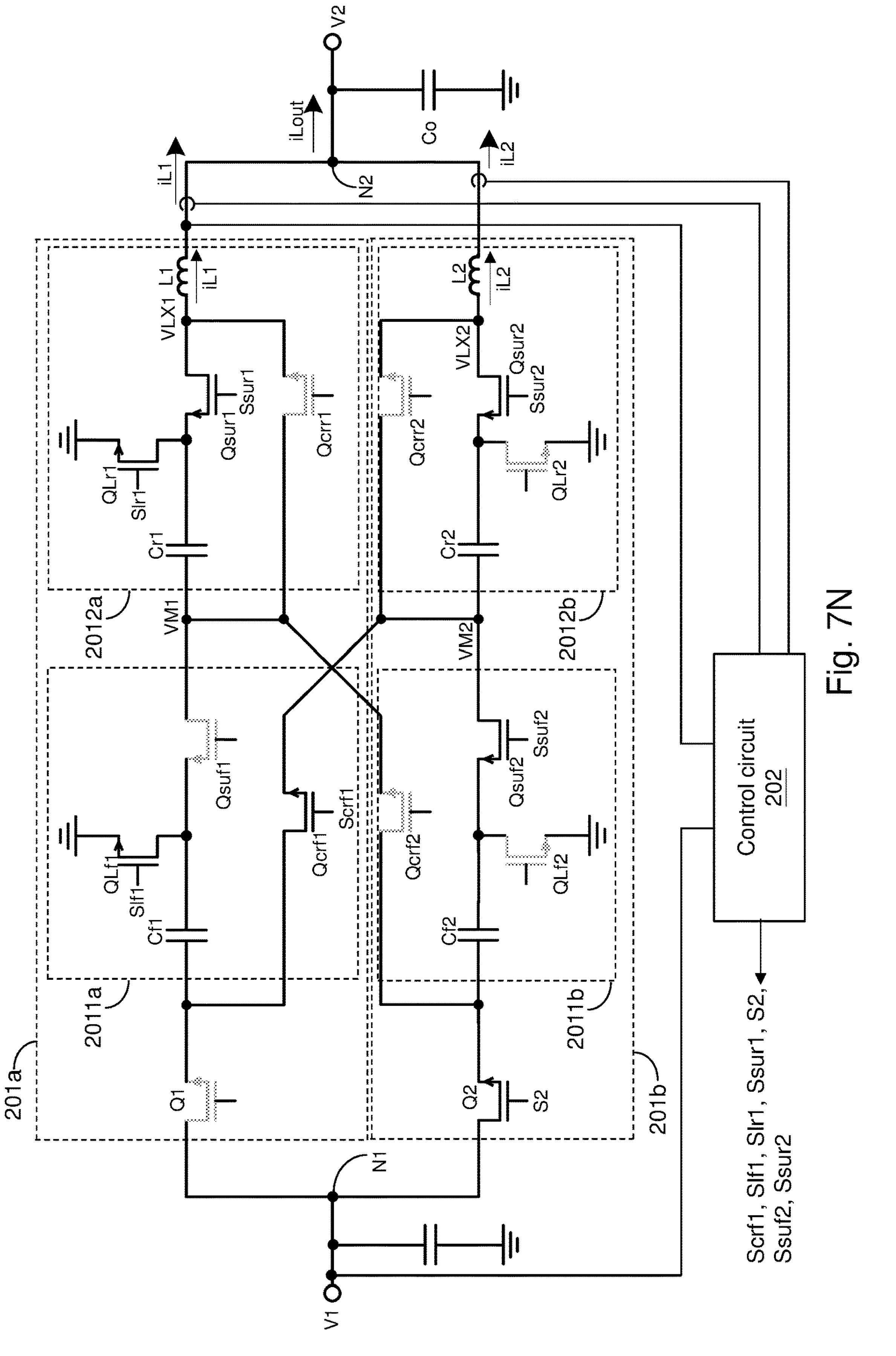
Figure 7O:
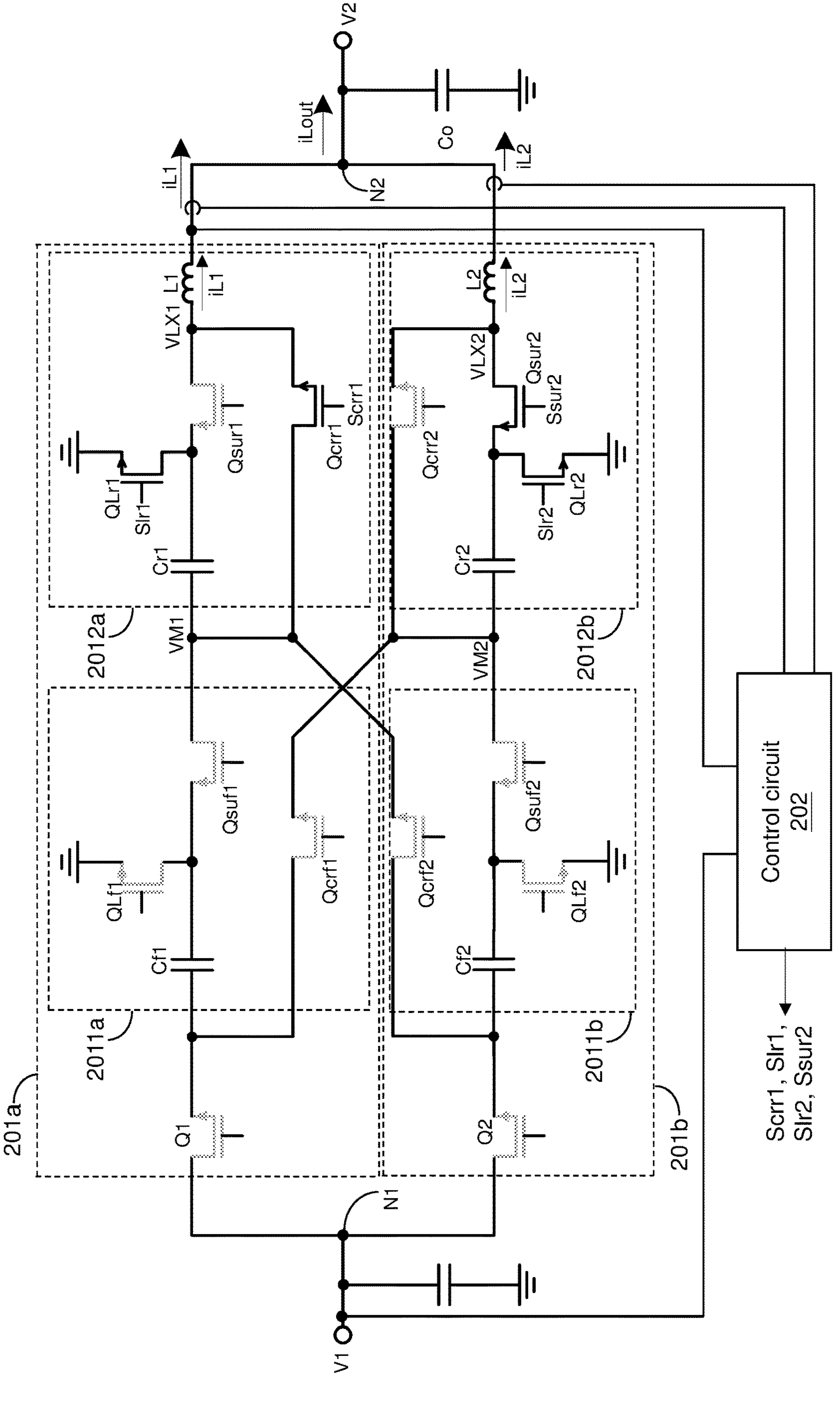
Figure 7P:
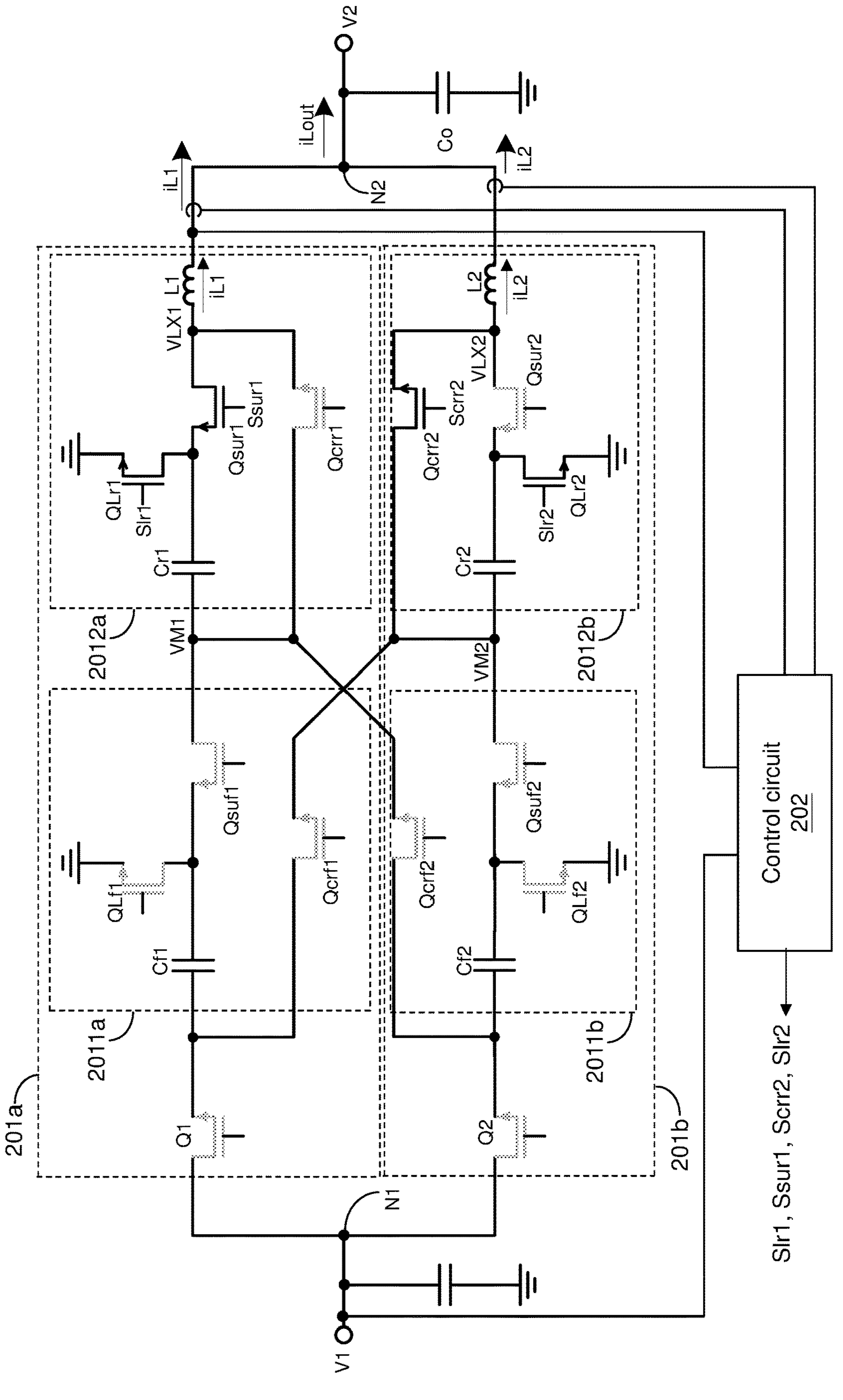

FIGS. 7A to 7P illustrate circuit schematics and operational diagrams of the multi-phase conversion circuit according to embodiments of the present invention. FIGS. 8A to 8C detail lists of different switching states for FIGS. 7A to 7P. In these figures, the symbol "V" signifies that the corresponding switch is on, while a blank space indicates the switch is off. Vcf1 and Vcf2 denote the across-voltages of the front capacitors Cf1 and Cf2, respectively, and Vcr1 and Vcr2 represent the across-voltages of the rear capacitors Cr1 and Cr2, respectively. As depicted in FIGS. 7A and 8A, in the first electrical connection state (ST1), switches Q2, front bridging switch Qcrf1, front low-side switch QLf1, front subordinate switch Qsuf2, rear low-side switch QLr1, rear bridging switch Qcrr1, and rear subordinate switch Qsur2 are turned off. Meanwhile, switch Q1, front subordinate switch Qsuf1, front bridging switch Qcrf2, front low-side switch QLf2, rear subordinate switch Qsur1, rear bridging switch Qcrr2, and rear low-side switch QLr2 are turned on as per the switching signals S1, Ssuf1, Ssur1, Scrf2, Scrr2, SLf2, SLr2. This configuration serially connects the front capacitor Cf1 and the rear capacitor Cr1 between the first power node N1 and the second power node N2. Additionally, the series circuit of the front capacitor Cf1 and the rear capacitor Cr1 is further serially connected with the output capacitor Co between the first power node N1 and the ground potential. The first power source then charges the front capacitor Cf1 and the rear capacitor Cr1. Simultaneously, the front capacitor Cf2 and the rear capacitor Cr1 are serially connected between the second power node N2 and the ground potential. The across-voltage of the front capacitor Cf2 is discharged to the second power source through the rear capacitor Cr1. The rear capacitor Cr2 is electrically connected between the second power node N2 and the ground potential, and its across-voltage is discharged to the second power source. Here, the rear capacitor Cr2 and the output capacitor Co are paralleled between the second power node N2 and the ground potential. The arrangement wherein the front capacitors Cf1 and Cf2 are serially connected between the first power node N1 and the ground potential serves to perform switched-capacitor voltage division on the first power source.

As shown in FIGS. 7B and 8A, in the second electrical connection state (ST2), switch Q1, front subordinate switch Qsuf1, front bridging switch Qcrf2, front low-side switch QLf2, rear subordinate switch Qsur1, rear bridging switch Qcrr2, rear low-side switch QLr2 are switched off, while switch Q2, front bridging switch Qcrf1, front low-side switch QLf1, front subordinate switch Qsuf2, rear low-side switch QLr1, rear bridging switch Qcrr1, rear subordinate switch Qsur2 are switched on according to the switching signals S2, Ssuf2, Ssur2, Scrf1, Scrr1, SLf1, SLr1. This causes the front capacitor Cf2 and the rear capacitor Cr2 to be serially connected between the first power node N1 and the second power node N2. The series circuit of the front capacitor Cf2 and the rear capacitor Cr2 is further serially connected with the output capacitor Co between the first power node N1 and the ground potential. The first power source charges the front capacitor Cf2 and the rear capacitor Cr2. Meanwhile, the front capacitor Cf1 and the rear capacitor Cr2 are serially connected between the second power node N2 and the ground potential. The across-voltage of the front capacitor Cf1 is discharged to the second power source through the rear capacitor Cr2. The rear capacitor Cr1 is electrically connected between the second power node N2 and the ground potential. The across-voltage of the rear capacitor Cr1 is discharged to the second power source, wherein the rear capacitor Cr1 and the output capacitor Co are paralleled between the second power node N2 and the ground potential. The front capacitor Cf2 and the front capacitor Cf1 are serially connected between the first power node N1 and the ground potential to perform switched-capacitor voltage division on the first power source.

In one embodiment, a plurality of switching signals S1, Ssuf1, Ssur1, Scrf2, Scrr2, SLf2, SLr2, Scrf1, Scrr1, SLf1, SLr1, S2, Ssuf2, Ssur2 guide the operation of both the first and second sub-conversion circuits, 201*a* and 201*b*, through transitions between the first and second electrical connection states. This facilitates switched-capacitor voltage division on the initial voltage V1. Specifically, the voltage on the first switching node VM1 is toggled between a first divided voltage, derived from the switched-capacitor voltage division of the first voltage V1, and a first reference potential. Similarly, it alters the voltage of the second switching node VM2 between a second divided voltage, also derived from the switched-capacitor voltage division of the first voltage V1, and a second reference potential. This process enables the conversion of the first power source into the second power source. Notably, the first and second reference potentials correspond to the across-voltages of the rear capacitors Cr1 and Cr2, respectively, with both the first and second divided voltages equating to half of the initial voltage V1. Additionally, the duty cycle of these numerous switching signals is set at 50%, ensuring that the across-voltages of the front capacitors Cf1 and Cf2 match half of the first voltage V1, while the across-voltages of the rear capacitors Cr1 and Cr2 amount to a quarter of the first voltage V1.

As shown in FIGS. 7C and 8A, in the third electrical connection state (ST3), the front bridging switches Qcrf1 and Qcrf2, along with the front low-side switches QLf1 and QLf2, and the rear bridging switches Qcrr1 and Qcrr2, plus the rear low-side switches QLr1 and QLr2, are switched off. Meanwhile, the switches Q1 and Q2, as well as the front subordinate switches Qsuf1 and Qsuf2, and the rear subordinate switches Qsur1 and Qsur2, are switched on according to the switching signals S1, S2, Ssuf1, Ssuf2, Ssur1, and Ssur2. This configuration causes the front capacitor Cf1 and the rear capacitor Cr1 to be serially connected between the first power node N1 and the second power node N2. Furthermore, the series circuit of the front capacitor Cf1 and the rear capacitor Cr1 is further serially connected with the output capacitor Co between the first power node N1 and the ground potential. Additionally, the front capacitor Cf2 and the rear capacitor Cr2 are serially connected between the first power node N1 and the second power node N2. The first power source charges both the front capacitor Cf1 and the rear capacitor Cr1, and the series circuit of the front capacitor Cf2 and the rear capacitor Cr2 is further serially connected with the output capacitor Co between the first power node N1 and the ground potential. Lastly, the first power source also charges the front capacitor Cf2 and the rear capacitor Cr2.

As shown in FIGS. 7D and 8A, in the fourth electrical connection state (ST4), the switches Q1 and Q2, along with the front subordinate switches Qsuf1 and Qsuf2, and the rear subordinate switches Qsur1 and Qsur2, are switched off. Meanwhile, the front bridging switches Qcrf1 and Qcrf2, the front low-side switches QLf1 and QLf2, the rear bridging switches Qcrr1 and Qcrr2, and the rear low-side switches QLr1 and QLr2 are switched on according to the switching signals Scrf1, Scrf2, SLf1, SLf2, Scrr1, Scrr2, SLr1, and SLr2. This configuration causes the front capacitor Cf2 to be coupled between the second power node N2 and the ground potential. The across-voltage of the front capacitor Cf2 is discharged to the second power source. Here, the front capacitor Cf2 and the output capacitor Co are paralleled between the second power node N2 and the ground potential. Similarly, the rear capacitor Cr1 is electrically connected between the second power node N2 and the ground potential. The across-voltage of the rear capacitor Cr1 is discharged to the second power source, wherein the rear capacitor Cr1 and the output capacitor Co are paralleled between the second power node N2 and the ground potential. Additionally, the front capacitor Cf1 is coupled between the second power node N2 and the ground potential. The across-voltage of the front capacitor Cf1 is discharged to the second power source, wherein the front capacitor Cf1 and the output capacitor Co are paralleled between the second power node N2 and the ground potential. Lastly, the rear capacitor Cr2 is electrically connected between the second power node N2 and the ground potential. The across-voltage of the rear capacitor Cr2 is discharged to the second power source, wherein the rear capacitor Cr2 and the output capacitor Co are paralleled between the second power node N2 and the ground potential.

As shown in FIGS. 7E and 8A, in the fifth electrical connection state (ST5), the switches Q2, the front bridging switch Qcrf1, the front low-side switch QLf1, the front subordinate switch Qsuf2, the rear low-side switch QLr1, the rear bridging switch Qcrr1, and the rear subordinate switch Qsur2 are switched off. Meanwhile, the switch Q1, the front subordinate switch Qsuf1, the front bridging switch Qcrf2, the front low-side switch QLf2, the rear subordinate switch Qsur1, the rear bridging switch Qcrr2, and the rear low-side switch QLr2 are switched on according to the switching signals S1, Ssuf1, Ssur1, Scrf2, Scrr2, SLf2, and SLr2. This action causes the front capacitor Cf1 and the rear capacitor Cr1 to be serially connected between the first power node N1 and the second power node N2. Furthermore, the series circuit of the front capacitor Cf1 and the rear capacitor Cr1 is further serially connected with the output capacitor Co between the first power node N1 and the ground potential. The first power source charges the front capacitor Cf1 and the rear capacitor Cr1 through the inductor L1. Simultaneously, the front capacitor Cf2 and the rear capacitor Cr1 are serially connected between the second power node N2 and the ground potential. The across-voltage of the front capacitor Cf2 is discharged to the second power source through the inductor L1 and the rear capacitor Cr1. In addition, the rear capacitor Cr2 and the inductor L2 are serially connected between the second power node N2 and the ground potential. The across-voltage of the rear capacitor Cr2 is discharged to the second power source through the inductor L2. At this point, the rear capacitor Cr2 and the output capacitor Co are paralleled between the second power node N2 and the ground potential. Meanwhile, the front capacitor Cf1 and the front capacitor Cf2 are serially connected between the first power node N1 and the ground potential to perform switched-capacitor voltage division on the first power source.

As shown in FIGS. 7F and 8A, in the sixth electrical connection state (ST6), the switches Q1, the front subordinate switch Qsuf1, the front bridging switch Qcrf2, the front low-side switch QLf2, the rear subordinate switch Qsur1, the rear bridging switch Qcrr2, and the rear low-side switch QLr2 are switched off. Meanwhile, the switch Q2, the front bridging switch Qcrf1, the front low-side switch QLf1, the front subordinate switch Qsuf2, the rear low-side switch QLr1, the rear bridging switch Qcrr1, and the rear subordinate switch Qsur2 are switched on according to the switching signals S2, Ssuf2, Ssur2, Scrf1, Scrr1, SLf1, SLr1. This causes the front capacitor Cf2 and the rear capacitor Cr2 to be serially connected between the first power node N1 and the second power node N2. Furthermore, the series circuit of the front capacitor Cf2 and the rear capacitor Cr2 is further serially connected with the output capacitor Co between the first power node N1 and the ground potential. The first power source charges the front capacitor Cf2 and the rear capacitor Cr2 through the inductor L2. Simultaneously, the front capacitor Cf1 and the rear capacitor Cr2 are serially connected between the second power node N2 and the ground potential. The across-voltage of the front capacitor Cf1 is discharged to the second power source through the inductor L2 and the rear capacitor Cr2. In addition, the rear capacitor Cr1 and the inductor L1 are serially connected between the second power node N2 and the ground potential. The across-voltage of the rear capacitor Cr1 is discharged to the second power source through the inductor L1. At this point, the rear capacitor Cr1 and the output capacitor Co are paralleled between the second power node N2 and the ground potential. Meanwhile, the front capacitor Cf2 and the front capacitor Cf1 are serially connected between the first power node N1 and the ground potential to perform switched-capacitor voltage division on the first power source.

In one embodiment, plural switching signals S1, Ssuf1, Ssur1, Scrf2, Scrr2, SLf2, SLr2, Scrf1, Scrr1, SLf1, SLr1, S2, Ssuf2, Ssur2 operate the first sub-conversion circuit 201*a* and the second sub-conversion circuit 201*b* between the fifth electrical connection state and the sixth electrical connection state. They perform switched-capacitor voltage division on the first voltage V1, switching the first switching node VM1 between the first divided voltage of the first voltage V1 obtained by the switched-capacitor voltage division and the first reference potential. The second switching node VM2 is switched between the second divided voltage of the first voltage V1 obtained by the switched-capacitor voltage division and the second reference potential, thereby converting the first power source into the second power source. The first reference potential and the second reference potential are respectively the across-voltage of the rear capacitor Cr1 and the across-voltage of the rear capacitor Cr2, and both the first and second divided voltages are half of the first voltage V1.

In one embodiment, the duty cycle of the plural switching signals S1, Ssuf1, Ssur1, Scrf2, Scrr2, SLf2, SLr2, Scrf1, Scrr1, SLf1, SLr1, S2, Ssuf2, Ssur2 is 50%, and both the across-voltage of the front capacitor Cf1 and the across-voltage of the front capacitor Cf2 are half of the first voltage V1, and both the across-voltage of the rear capacitor Cr1 and the across-voltage of the rear capacitor Cr2 are a quarter of the first voltage V1. In one embodiment, the switching frequency includes a first resonant frequency related to the resonance of inductor L1 and rear capacitor Cr1, and a second resonant frequency related to the resonance of inductor L2 and rear capacitor Cr2.

As shown in FIGS. 7G and 8A, in the seventh electrical connection state (ST7), the switches Q1, Q2, the front bridging switches Qcrf1, Qcrf2, the front low-side switches QLf1, QLf2, the front subordinate switches Qsuf1, Qsuf2, and the rear bridging switches Qcrr1, Qcrr2 are switched off. Meanwhile, the rear subordinate switches Qsur1, the rear low-side switches QLr1, Qsur2, and QLr2 are switched on according to the switching signals Ssur1, SLr1, Ssur2, SLr2. This causes the inductor L1 to be coupled between the ground potential and the second power node N2. The inductor L1 and the output capacitor Co are paralleled between the second power node N2 and the ground potential. The inductor L2 is also coupled between the ground potential and the second power node N2. The inductor L2 and the output capacitor Co are paralleled between the second power node N2 and the ground potential. This arrangement causes the inductor current iL1 to continue flowing towards the second power source, and the inductor current iL2 to continue flowing towards the second power source.

As shown in FIGS. 7H and 8A, in the eighth electrical connection state (ST8), the front subordinate switches Qsuf1, Qsuf2, the front low-side switches QLf1, QLf2, the rear subordinate switches Qsur1, Qsur2, and the rear low-side switches QLr1, QLr2 are switched off. Meanwhile, the switches Q1, Q2, the front bridging switches Qcrf1, Qcrf2, and the rear bridging switches Qcrr1, Qcrr2 are switched on according to the switching signals S1, S2, Scrf1, Scrf2, Scrr1, Scrr2. This causes the inductor L1 to be coupled between the first power node N1 and the second power node N2, and the inductor L2 to be coupled between the first power node N1 and the second power node N2.

As shown in FIGS. 7I and 8B, in the ninth electrical connection state (ST9), the front bridging switches Qcrf1 and Qcrf2, and the front low-side switches QLf1 and QLf2 are switched off. The rear bridging switches Qcrr1 and Qcrr2 remain continuously on, while the rear subordinate switches Qsur1 and Qsur2 remain continuously off. Meanwhile, the switches Q1 and Q2, the front subordinate switches Qsuf1 and Qsuf2, and the rear low-side switches QLr1 and QLr2 are switched on according to the switching signals S1, S2, Ssuf1, Ssuf2, SLr1, and SLr2. This configuration causes the front capacitor Cf1 to be coupled between the first power node N1 and the second power node N2. The front capacitor Cf1 and the output capacitor Co are serially connected between the first power node N1 and the ground potential. Additionally, the rear capacitor Cr1 is coupled between the ground potential and the second power node N2. The rear capacitor Cr1 and the output capacitor Co are paralleled between the second power node N2 and the ground potential. Similarly, the front capacitor Cf2 is coupled between the first power node N1 and the second power node N2. The front capacitor Cf2 and the output capacitor Co are serially connected between the first power node N1 and the ground potential. The rear capacitor Cr2 is coupled between the ground potential and the second power node N2. The rear capacitor Cr2 and the output capacitor Co are paralleled between the second power node N2 and the ground potential. This arrangement results in charging the front capacitors Cf1 and Cf2, and discharging the rear capacitors Cr1 and Cr2.

As shown in FIGS. 7J and 8B, in the tenth electrical connection state (ST10), the switches Q1 and Q2, the front subordinate switches Qsuf1 and Qsuf2 are switched off. The rear bridging switches Qcrr1 and Qcrr2 remain continuously on, while the rear subordinate switches Qsur1 and Qsur2 remain continuously off. Meanwhile, the front bridging switches Qcrf1 and Qcrf2, the front low-side switches QLf1 and QLf2, and the rear low-side switches QLr1 and QLr2 are switched on according to the switching signals Scrf1, SLf1, Scrf2, SLf2, SLr1, and SLr2. This setup causes the front capacitor Cf1 to be coupled between the ground potential and the second power node N2, wherein the front capacitor Cf1 and the output capacitor Co are paralleled between the second power node N2 and the ground potential. The front capacitor Cf2 is also coupled between the ground potential and the second power node N2, wherein the front capacitor Cf2 and the output capacitor Co are paralleled between the second power node N2 and the ground potential. Similarly, the rear capacitor Cr1 is coupled between the ground potential and the second power node N2, wherein the rear capacitor Cr1 and the output capacitor Co are paralleled between the second power node N2 and the ground potential. The rear capacitor Cr2 is also coupled between the ground potential and the second power node N2, wherein the rear capacitor Cr2 and the output capacitor Co are paralleled between the second power node N2 and the ground potential. This process results in discharging the front capacitors Cf1, Cf2, and the rear capacitors Cr1, Cr2.

As shown in FIGS. 7K and 8B, in the eleventh electrical connection state (ST11), the rear bridging switches Qcrr1, Qcrr2, and the rear low-side switches QLr1, QLr2 are switched off. The switches Q1 and Q2, and the front low-side switches QLf1 and QLf2 remain continuously on, while the front subordinate switches Qsuf1 and Qsuf2 remain continuously off. Meanwhile, the front bridging switches Qcrf1 and Qcrf2, and the rear subordinate switches Qsur1 and Qsur2 are switched on according to the switching signals Scrf1, Scrf2, Ssur1, and Ssur2. This configuration causes the rear capacitor Cr1 to be coupled between the first power node N1 and the second power node N2. The rear capacitor Cr1 and the output capacitor Co are serially connected between the first power node N1 and the ground potential. Similarly, the rear capacitor Cr2 is coupled between the first power node N1 and the second power node N2. The rear capacitor Cr2 and the output capacitor Co are serially connected between the first power node N1 and the ground potential. Additionally, the front capacitor Cf1 and the input capacitor Cin are paralleled between the ground potential and the first power node N1, as are the front capacitor Cf2 and the input capacitor Cin. This arrangement charges the rear capacitors Cr1 and Cr2.

As shown in FIGS. 7L and 8B, in the twelfth electrical connection state (ST12), the front bridging switches Qcrf1 and Qcrf2, along with the rear subordinate switches Qsur1 and Qsur2, are switched off. Meanwhile, the switches Q1 and Q2, the front low-side switches QLf1 and QLf2 remain continuously on, with the front subordinate switches Qsuf1 and Qsuf2 also remaining off. The rear bridging switches Qcrr1, Qcrr2, and the rear low-side switches QLr1, QLr2 are switched on, following the switching signals Scrr1, SLr1, Scrr2, SLr2. This causes the rear capacitor Cr1 to be coupled between the ground potential and the second power node N2, with the rear capacitor Cr1 and the output capacitor Co paralleled between the second power node N2 and the ground potential. Similarly, the rear capacitor Cr2 is coupled between the ground potential and the second power node N2, with the rear capacitor Cr2 and the output capacitor Co paralleled between the second power node N2 and the ground potential. The front capacitor Cf1 and the input capacitor Cin are paralleled between the ground potential and the first power node N1, as are the front capacitor Cf2 and the input capacitor Cin. This arrangement results in the discharge of the rear capacitors Cr1 and Cr2.

As shown in FIGS. 7M and 8C, in the thirteenth electrical connection state (ST13), the switch Q2, the front low-side switch QLf1, the front bridging switch Qcrf1, the front subordinate switch Qsuf2, the rear low-side switch QLr1, and the rear bridging switches Qcrr1, Qcrr2 are switched off. The switch Q1, the front subordinate switch Qsuf1, the front bridging switch Qcrf2, the front low-side switch QLf2, the rear subordinate switch Qsur1, the rear low-side switch QLr2, and the rear subordinate switch Qsur2 are switched on according to the switching signals S1, Ssuf1, Scrf2, SLf2, Ssur1, SLr2, Ssur2. This arrangement serially connects the front capacitor Cf1 and the rear capacitor Cr1 between the first power node N1 and the second power node N2, which is further serially connected with the output capacitor Co between the first power node N1 and the ground potential. The first power source charges the front capacitor Cf1 and the rear capacitor Cr1, while the front capacitor Cf2 and the rear capacitor Cr1 are serially connected between the second power node N2 and the ground potential. The across-voltage of the front capacitor Cf2 is discharged to the second power source through the rear capacitor Cr1. The front capacitors Cf1 and Cf2 are serially connected between the first power node N1 and the ground potential for switched-capacitor voltage division on the first power source. The inductor L2 is coupled between the ground potential and the second power node N2, paralleling it with the output capacitor Co between the second power node N2 and the ground potential, allowing the inductor current iL2 to continue flowing towards the second power source.

As shown in FIGS. 7N and 8C, in the fourteenth electrical connection state (ST14), the switch Q1, the front subordinate switch Qsuf1, the front bridging switch Qcrf2, the front low-side switch QLf2, and the rear bridging switches Qcrr1, Qcrr2, and the rear low-side switch QLr2 are turned off. The switch Q2, the front low-side switch QLf1, the front bridging switch Qcrf1, the front subordinate switch Qsuf2, the rear low-side switch QLr1, and the rear subordinate switches Qsur1, Qsur2 are turned on, following the signals S2, SLf1, Scrf1, Ssuf2, SLr1, Ssur1, Ssur2. This configuration serially connects the front capacitor Cf2 and the rear capacitor Cr2 between the first power node N1 and the second power node N2, further serially connecting them with the output capacitor Co between the first power node N1 and the ground potential. The first power source charges the front capacitor Cf2 and the rear capacitor Cr2, while the front capacitor Cf1 and the rear capacitor Cr2 are serially connected between the second power node N2 and the ground potential, discharging the across-voltage of the front capacitor Cf1 to the second power source through the rear capacitor Cr2. The front capacitors Cf2 and Cf1 are serially connected between the first power node N1 and the ground potential to perform switched-capacitor voltage division on the first power source. The inductor L1 is coupled between the ground potential and the second power node N2, paralleling it with the output capacitor Co between the second power node N2 and the ground potential, allowing the inductor current iL1 to continue flowing towards the second power source.

As shown in FIGS. 7O and 8C, in the fifteenth electrical connection state (ST15), switches Q1, Q2, the front low-side switches QLf1, QLf2, the front subordinate switches Qsuf1, Qsuf2, the front bridging switches Qcrf1, Qcrf2, and the rear subordinate switch Qsur1, and the rear bridging switch Qcrr2 are switched off. The rear low-side switch QLr1, the rear bridging switch Qcrr1, the rear low-side switch QLr2, and the rear subordinate switch Qsur2 are switched on, according to the switching signals SLr1, Scrr1, SLr2, Ssur2. This configuration electrically connects the rear capacitor Cr1 between the second power node N2 and the ground potential. The series circuit of the rear capacitor Cr1 and the inductor L1 is paralleled with the output capacitor Co between the second power node N2 and the ground potential, and the across-voltage of the rear capacitor Cr1 is discharged to the second power source. Simultaneously, the inductor L2 is coupled between the ground potential and the second power node N2. The inductor L2 and the output capacitor Co are paralleled between the second power node N2 and the ground potential, allowing the inductor current iL2 to continue flowing towards the second power source.

As shown in FIGS. 7P and 8C, in the sixteenth electrical connection state (ST16), switches Q1, Q2, the front low-side switches QLf1, QLf2, the front subordinate switches Qsuf1, Qsuf2, the front bridging switches Qcrf1, Qcrf2, the rear subordinate switch Qsur2, and the rear bridging switch Qcrr1 are switched off. The rear low-side switch QLr2, the rear bridging switch Qcrr2, the rear low-side switch QLr1, and the rear subordinate switch Qsur1 are switched on, following the switching signals SLr2, Scrr2, SLr1, Ssur1. This setup electrically connects the rear capacitor Cr2 between the second power node N2 and the ground potential. The series circuit of the rear capacitor Cr2 and the inductor L2 is paralleled with the output capacitor Co between the second power node N2 and the ground potential, and the across-voltage of the rear capacitor Cr2 is discharged to the second power source. Concurrently, the inductor L1 is coupled between the ground potential and the second power node N2. The inductor L1 and the output capacitor Co are paralleled between the second power node N2 and the ground potential, facilitating the continuous flow of the inductor current iL1 towards the second power source.

Figure 9:
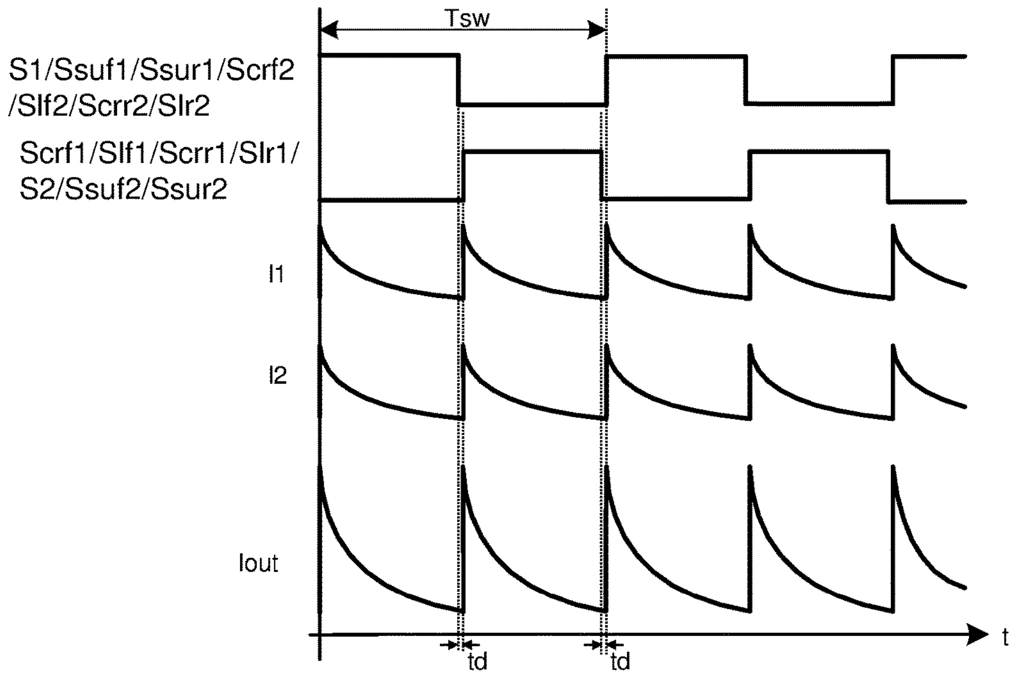
FIG. 9 shows a signal waveform diagram of relevant signals for the multi-phase conversion circuit of FIG. 2A according to an embodiment of the present invention.

FIG. 9 shows a signal waveform diagram related to the multi-phase conversion circuit of FIG. 2A according to an embodiment of the present invention. The switching signals S1, S2, SLf1, SLf2, SLr1, SLr2, Scrf1, Scrf2, Scrr1, Scrr2, Ssuf1, Ssuf2, Ssur1, and Ssur2, currents I1, I2, output current Iout are displayed in FIG. 9. As shown in FIG. 9, there is a dead time td between the falling edge of the switching signals S1, SLf2, SLr2, Scrf2, Scrr2, Ssuf1, Ssur1 and the rising edge of the switching signals S2, SLf1, SLr1, Scrf1, Scrr1, Ssuf2, Ssur2.

Figure 10:
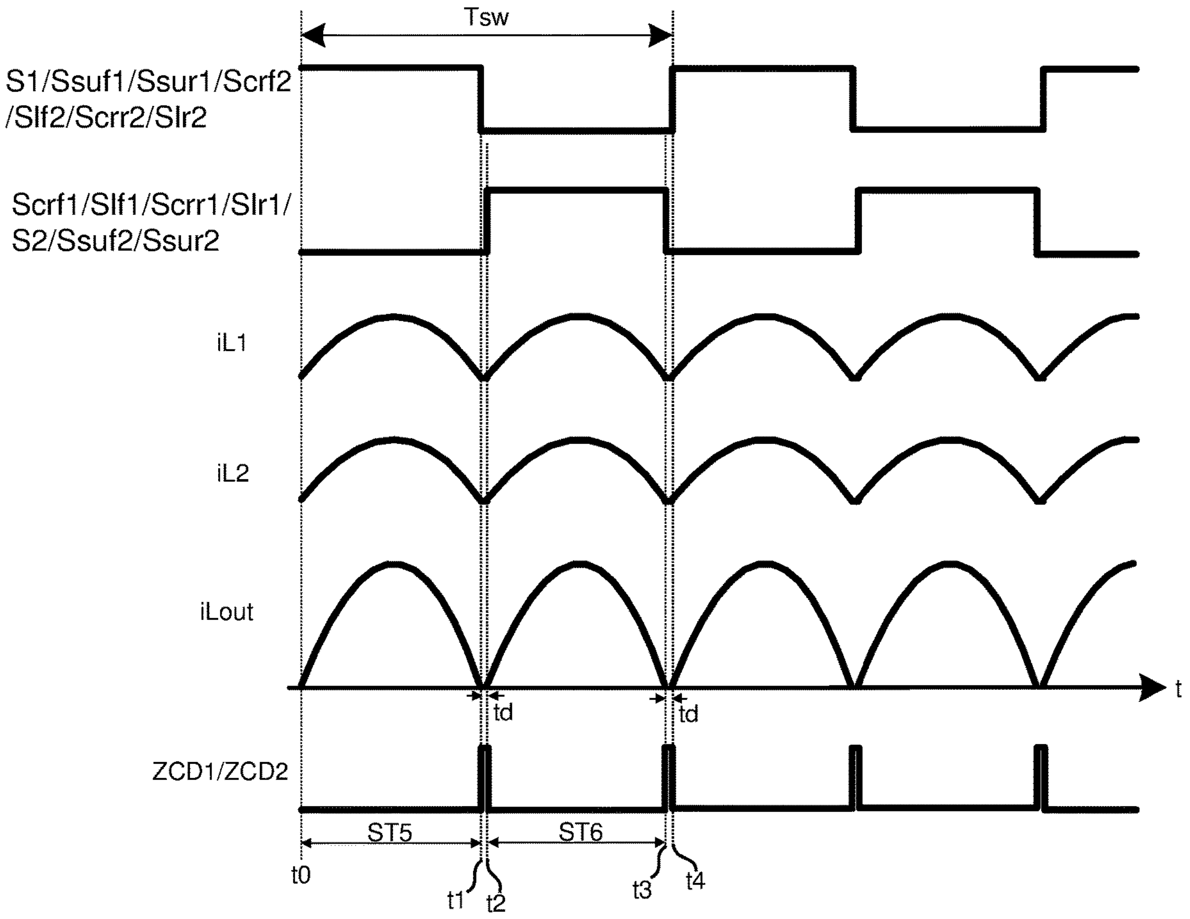
FIG. 10 shows a signal waveform diagram of relevant signals for the multi-phase conversion circuit of FIG. 4 according to an embodiment of the present invention.

FIG. 10 shows a signal waveform diagram related to the multi-phase conversion circuit of FIG. 4 according to an embodiment of the present invention. The switching signals S1, S2, SLf1, SLf2, SLr1, SLr2, Scrf1, Scrf2, Scrr1, Scrr2, Ssuf1, Ssuf2, Ssur1, and Ssur2, inductor currents iL1, iL2, output inductor current iLout, zero current detection signals ZCD1, ZCD2 are displayed in FIG. 10. As shown in FIG. 10, this embodiment in a switching period Tsw has a sequence of plural electrical connection states as the fifth electrical connection state ST5 (from time t0 to time t1) and the sixth electrical connection state ST6 (from time t2 to time t3), followed by repeating the switching period Tsw. Here, the fifth electrical connection state ST5 is shown in FIG. 7E, and the sixth electrical connection state ST6 is shown in FIG. 7F. In this embodiment, the switching frequency is related to the resonant frequency, making the multi-phase conversion circuit 20 operate in a resonant mode to control the voltage ratio between the second voltage V2 and the first voltage V1 related to the voltage division ratio of the first voltage V1 and its first or second divided voltage, wherein the resonant frequency is related to the capacitance value of the front capacitor Cf1 and/or the rear capacitor Cr1 and the inductance value of the inductor L1, or the capacitance value of the front capacitor Cf2 and/or the rear capacitor Cr2 and the inductance value of the inductor L2. Please refer simultaneously to FIG. 10, FIG. 2B or 2C, and FIG. 4, wherein the control circuit 202 also generates switching signals and switches the electrical connection state according to at least one of the following indicated by the zero current detection signals ZCD1 and ZCD2: the inductor current iL1 flowing through the corresponding inductor L1 is a zero current; or the inductor current iL2 flowing through the corresponding inductor L2 is a zero current.

Figure 11:
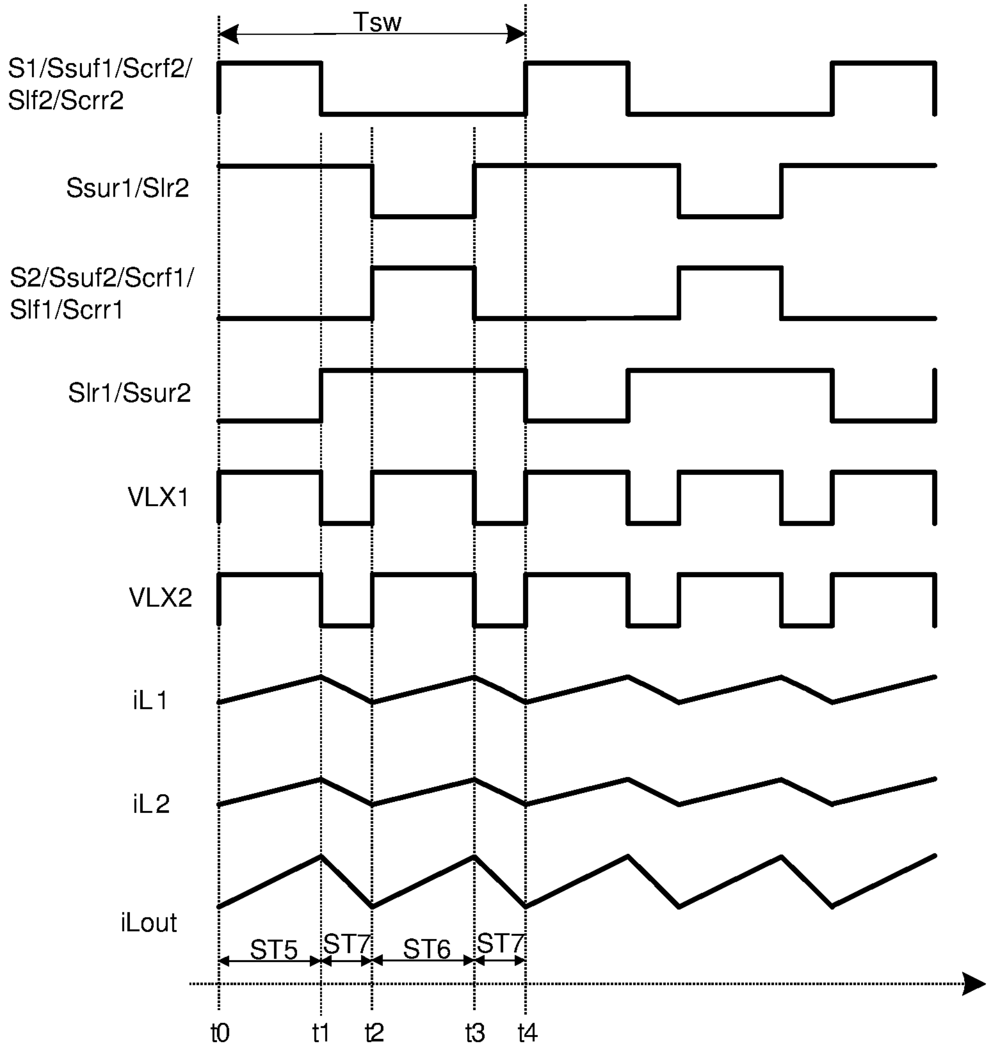
FIG. 11 shows a signal waveform diagram of relevant signals for the multi-phase conversion circuit of FIG. 4 according to another embodiment of the present invention.

FIG. 11 shows a signal waveform diagram related to the multi-phase conversion circuit of FIG. 4 according to another embodiment of the present invention. The switching signals S1, S2, SLf1, SLf2, SLr1, SLr2, Scrf1, Scrf2, Scrr1, Scrr2, Ssuf1, Ssuf2, Ssur1, and Ssur2, switching node voltages VLX1, VLX2, inductor currents iL1, iL2, output inductor current iLout are displayed in FIG. 11. This embodiment in a switching period Tsw has a sequence of plural electrical connection states as the fifth electrical connection state ST5 (from time t0 to time t1), the seventh electrical connection state ST7 (from time t1 to time t2), the sixth electrical connection state ST6 (from time t2 to time t3), and the seventh electrical connection state ST7 (from time t3 to time t4), followed by repeating the switching period Tsw. Here, the fifth electrical connection state ST5 is shown in FIG. 7E, the sixth electrical connection state ST6 is shown in FIG. 7F, and the seventh electrical connection state ST7 is shown in FIG. 7G. In this embodiment, the control circuit 202 adjusts the duty cycle of plural switching signals according to the conversion ratio. In this embodiment, the switching frequency is much higher than the resonant frequency, making the multi-phase conversion circuit 20 operate in a non-resonant mode, thereby regulating the second voltage V2 to a predetermined level, or regulating the first voltage V1 to a predetermined level, wherein the resonant frequency is related to the capacitance value of the front capacitor Cf1 and/or the rear capacitor Cr1 and the inductance value of the inductor L1, or the capacitance value of the front capacitor Cf2 and/or the rear capacitor Cr2 and the inductance value of the inductor L2.

Figure 12:
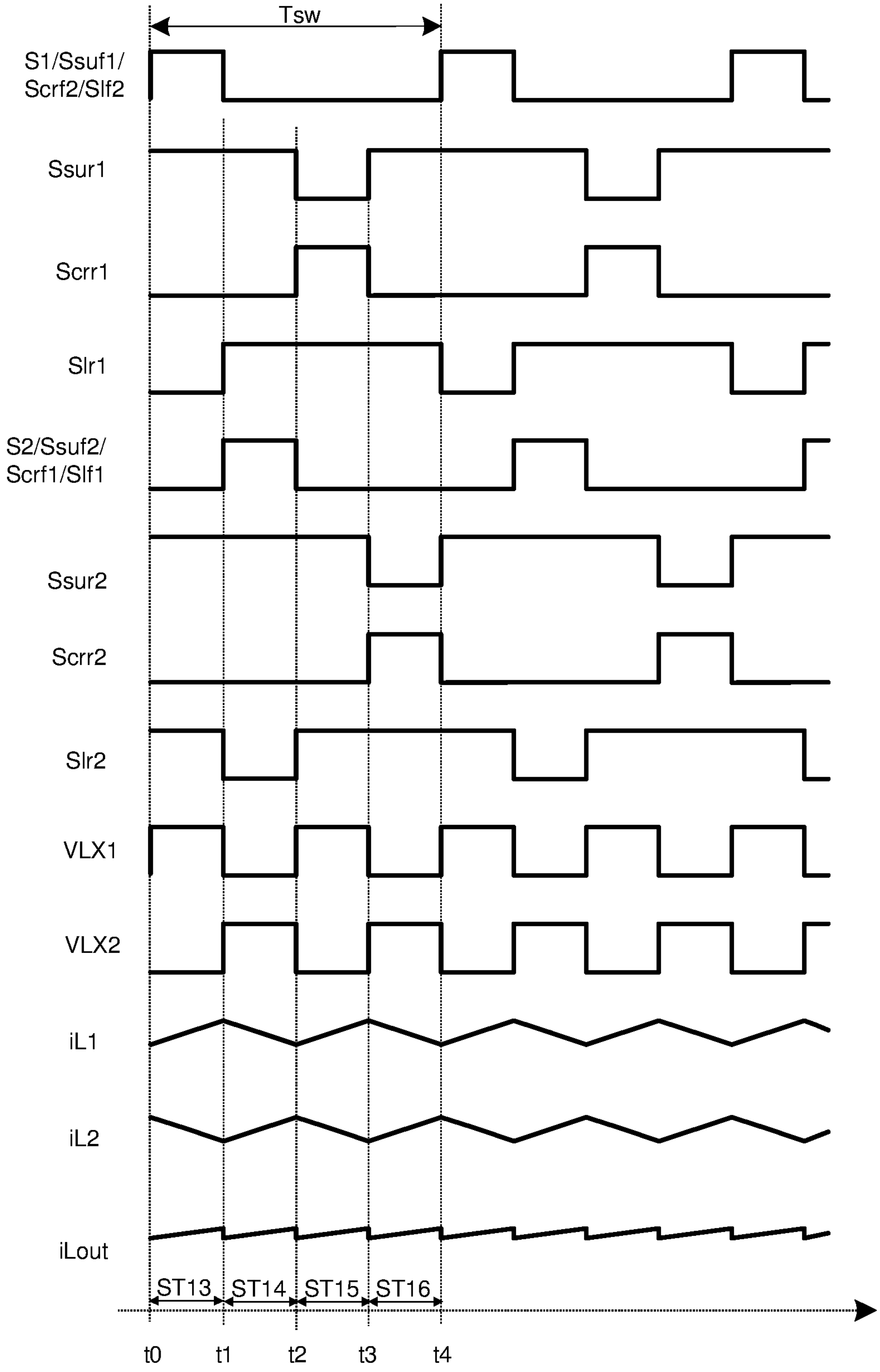
FIG. 12 shows a signal waveform diagram of relevant signals for the multi-phase conversion circuit of FIG. 4 according to a further embodiment of the present invention.

FIG. 12 shows a signal waveform diagram related to the multi-phase conversion circuit of FIG. 4 according to yet another embodiment of the present invention. The switching signals S1, S2, SLf1, SLf2, SLr1, SLr2, Scrf1, Scrf2, Scrr1, Scrr2, Ssuf1, Ssuf2, Ssur1, and Ssur2, switching node voltages VLX1, VLX2, inductor currents iL1, iL2, output inductor current iLout are displayed in FIG. 12. This embodiment in a switching period Tsw has a sequence of plural electrical connection states as the thirteenth electrical connection state ST13 (from time t0 to time t1), the fourteenth electrical connection state ST14 (from time t1 to time t2), the fifteenth electrical connection (from time t2 to time t3), and the sixteenth electrical connection state ST16 (from time t3 to time t4), followed by repeating the switching period Tsw. Here, the thirteenth electrical connection state ST13 is shown in FIG. 7M, the fourteenth electrical connection state ST14 is shown in FIG. 7N, the fifteenth electrical connection state ST15 is shown in FIG. 7O, and the sixteenth electrical connection state ST16 is shown in FIG. 7P.

Figure 13:
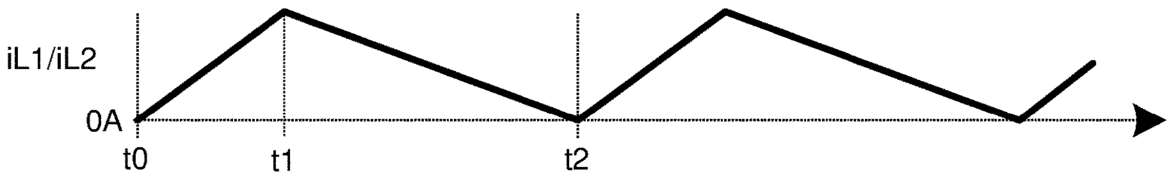
FIGS. 13 to 16 show signal waveform diagrams of relevant signals for the multi-phase conversion circuit of FIG. 4 according to an embodiment of the present invention.

FIG. 13 to FIG. 16 show signal waveform diagrams related to the multi-phase conversion circuit of FIG. 4 according to embodiments of the present invention. Please refer simultaneously to FIG. 13 and FIG. 4, wherein the control circuit 202 generates switching signals S1, S2, SLf1, SLf2, SLr1, SLr2, Scrf1, Scrf2, Scrr1, Scrr2, Ssuf1, Ssuf2, Ssur1, and Ssur2 to switch the corresponding switches Q1, Q2, front low-side switches QLf1, QLf2, rear low-side switches QLr1, QLr2, front bridging switches Qcrf1, Qcrf2, rear bridging switches Qcrr1, Qcrr2, front subordinate switches Qsuf1, Qsuf2, rear subordinate switches Qsur1, Qsur2, to switch the electrical connection states, and make the first sub-conversion circuit 201*a* and the second sub-conversion circuit 201*b* operate in the boundary conduction mode (BCM). As shown in FIG. 13, the corresponding switches are switched at the zero current time point when the inductor currents iL1 or iL2 are zero, thereby achieving zero current switching (ZCS) for soft switching.

Figure 14:
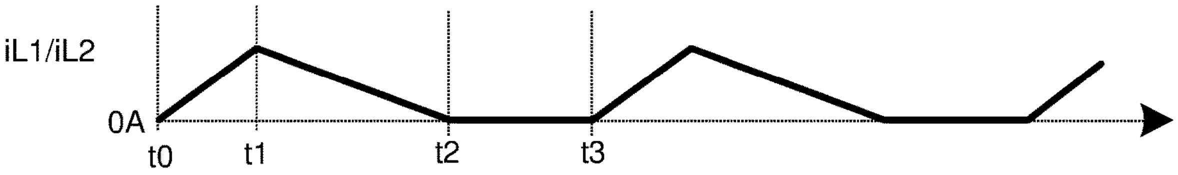
Figure 15:
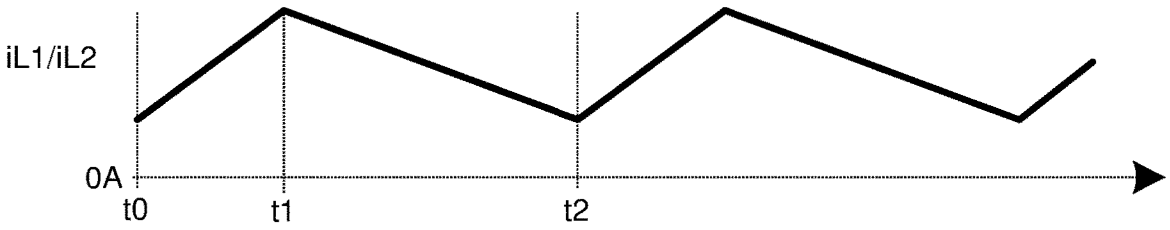

Please refer simultaneously to FIG. 14 and FIG. 4, wherein the control circuit 202 generates switching signals S1, S2, SLf1, SLf2, SLr1, SLr2, Scrf1, Scrf2, Scrr1, Scrr2, Ssuf1, Ssuf2, Ssur1, and Ssur2 to switch the corresponding switches Q1, Q2, front low-side switches QLf1, QLf2, rear low-side switches QLr1, QLr2, front bridging switches Qcrf1, Qcrf2, rear bridging switches Qcrr1, Qcrr2, front subordinate switches Qsuf1, Qsuf2, rear subordinate switches Qsur1, Qsur2, to switch the electrical connection states, and make the first sub-conversion circuit 201*a* and the second sub-conversion circuit 201*b* operate in the discontinuous conduction mode (DCM). Please refer simultaneously to FIG. 15 and FIG. 4, wherein the control circuit 202 generates switching signals S1, S2, SLf1, SLf2, SLr1, SLr2, Scrf1, Scrf2, Scrr1, Scrr2, Ssuf1, Ssuf2, Ssur1, and Ssur2 to switch the corresponding switches Q1, Q2, front low-side switches QLf1, QLf2, rear low-side switches QLr1, QLr2, front bridging switches Qcrf1, Qcrf2, rear bridging switches Qcrr1, Qcrr2, front subordinate switches Qsuf1, Qsuf2, rear subordinate switches Qsur1, Qsur2, to switch the electrical connection states, and make the first sub-conversion circuit 201*a* and the second sub-conversion circuit 201*b* operate in the continuous conduction mode (CCM).

Figure 16:
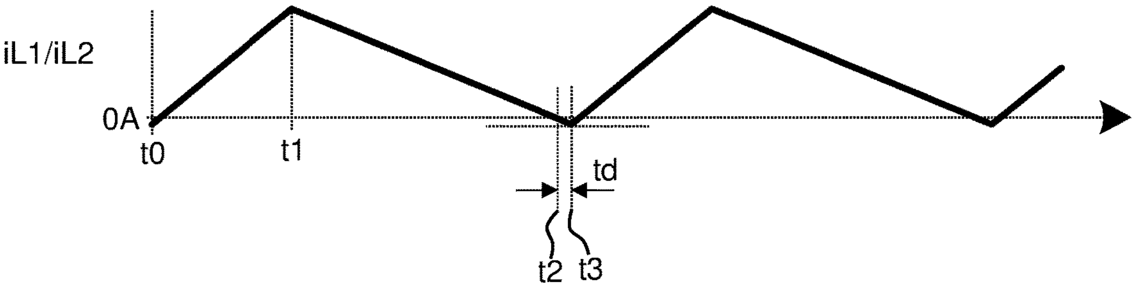
Figure 17:
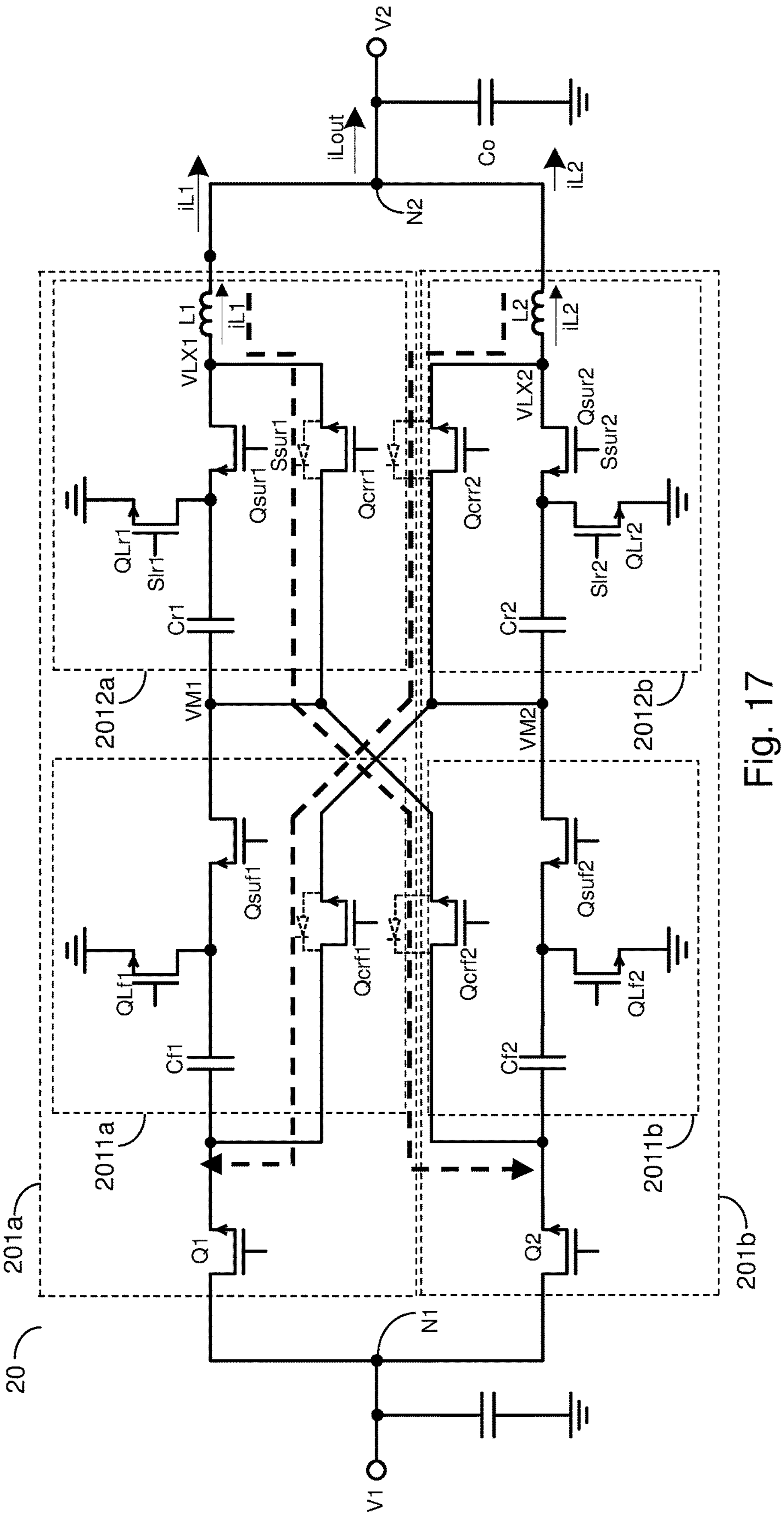
FIG. 17 shows a schematic diagram and operation diagram of a multi-phase conversion circuit according to an embodiment of the present invention.

FIG. 17 shows a circuit schematic and operational diagram of the multi-phase conversion circuit according to an embodiment of the present invention. Please refer simultaneously to FIGS. 16 and 17, wherein the switching signals Scrf1, Scrf2, Scrr1, Scrr2 are generated after the inductor L1 or L2 is demagnetized and the inductor current iL1 or iL2 flowing through the inductor L1 or L2 reaches a zero current, and after waiting for a certain dead-time td, the corresponding front bridging switches Qcrf1, Qcrf2, rear bridging switches Qcrr1, Qcrr2 are switched. As shown in FIG. 17, the reverse inductor current iL2 on the inductor L2 flows along the path indicated by the thick dashed line to the first voltage V1 or the second voltage V2, thereby utilizing the energy on the front bridging switch Qcrf1 and the rear bridging switch Qcrr2 to conduct the body diodes on the front bridging switch Qcrf1 and the rear bridging switch Qcrr2 for zero-voltage switching (ZVS) for soft switching, and the reverse inductor current iL1 on the inductor L1 flows along the path indicated by the thick dashed line to the first voltage V1 or the second voltage V2, thereby utilizing the energy on the front bridging switch Qcrf2 and the rear bridging switch Qcrr1 to conduct the body diodes on the front bridging switch Qcrf2 and the rear bridging switch Qcrr1 for zero-voltage switching (ZVS) for soft switching. As shown in FIG. 16, the inductor current iL1 is a zero current at the first zero current time point, and the inductor current iL2 is a zero current at the second zero current time point, the control circuit 202 generates switching signals after the first zero current time point and/or the second zero current time point, after waiting for a corresponding first dead-time and/or a second dead-time td, to switch the electrical connection states.

In summary, the present invention achieves low voltage stress and low component count, supports more voltage conversion ratios, and supports resonant mode, modulation mode operation, and resonant operation with soft switching to reduce power consumption.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a part of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A multi-phase conversion circuit for converting a first voltage of a first power source at a first power node to a second voltage of a second power source at a second power node, comprising:

a first sub-conversion circuit, coupled between the first and second power nodes;

a second sub-conversion circuit, coupled between the first and second power nodes; and a control circuit, configured to generate plural switching signals to control the first and second sub-conversion circuits for converting the first voltage to the second voltage;

wherein the first sub-conversion circuit includes:

a first switch coupled to the first power node;

a first front switched-capacitor conversion circuit, connected between the first switch and a first switching node, and including a first front bridging switch, a first front low-side switch, a first front subordinate switch, and a first front capacitor; and a first rear switched-capacitor conversion circuit, connected between the first switching node and the second power node, and including a first rear bridging switch, a first rear low-side switch, a first rear subordinate switch, and a first rear capacitor;

wherein the first switch, the first front switched-capacitor conversion circuit, and the first rear switched-capacitor conversion circuit are sequentially connected in series between the first and second power nodes;

wherein the second sub-conversion circuit includes:

a second switch coupled to the first power node;

a second front switched-capacitor conversion circuit, connected between the second switch and a second switching node, and including a second front bridging switch, a second front low-side switch, a second front subordinate switch, and a second front capacitor; and a second rear switched-capacitor conversion circuit, connected between the second switching node and the second power node, and including a second rear bridging switch, a second rear low-side switch, a second rear subordinate switch, and a second rear capacitor;

wherein the second switch, the second front switched-capacitor conversion circuit, and the second rear switched-capacitor conversion circuit are sequentially connected in series between the first and second power nodes;

wherein the first and second sub-conversion circuits are configured to periodically switch electrical connection relationships of the first front capacitor, the first rear capacitor, the second front capacitor, and/or the second rear capacitor between plural electrical connection states based on a switching frequency, according to the plural switching signals;

wherein the plural switching signals control the first front capacitor, the first rear capacitor, the second front capacitor, and/or the second rear capacitor to perform switched-capacitor voltage division on the first voltage, switching the first switching node between a first divided voltage of the first voltage and a first reference potential, and switching the second switching node between a second divided voltage of the first voltage and a second reference potential, thereby performing power conversion from the first power node to the second power node;

wherein the first and second reference potentials are each related to the first voltage or its division, a ground potential, an across-voltage of the first front capacitor, an across-voltage of the second front capacitor, an across-voltage of the first rear capacitor, and/or an across-voltage of the second rear capacitor;

wherein the first front subordinate switch is coupled between the first front capacitor and the first switching node, configured to determine whether the first front capacitor and the first switching node are electrically connected according to a corresponding switching signal;

wherein the first rear subordinate switch is coupled between the first rear capacitor and the second power node, configured to determine whether the first rear capacitor and the second power node are electrically connected according to a corresponding switching signal;

wherein the second front subordinate switch is coupled between the second front capacitor and the second switching node, configured to determine whether the second front capacitor and the second switching node are electrically connected according to a corresponding switching signal; and wherein the second rear subordinate switch is coupled between the second rear capacitor and the second power node, configured to determine whether the second rear capacitor and the second power node are electrically connected according to a corresponding switching signal.

2. The multi-phase conversion circuit of claim 1, wherein the plural electrical connection states include a first electrical connection state and a second electrical connection state;

wherein the first electrical connection state includes:

the first front capacitor and the first rear capacitor serially connected between the first power node and the second power node, and the first power source charging the first front capacitor and the first rear capacitor;

the second front capacitor and the first rear capacitor serially connected between the second power node and the ground potential, and the across-voltage of the second front capacitor being discharged to the second power source through the first rear capacitor; and the second rear capacitor electrically connected between the second power source and the ground potential, and the across-voltage of the second rear capacitor being discharged to the second power source; wherein the second electrical connection state includes:

the second front capacitor and the second rear capacitor serially connected between the first power node and the second power node, and the first power source charging the second front capacitor and the second rear capacitor;

the first front capacitor and the second rear capacitor serially connected between the second power node and the ground potential, and the across-voltage of the first front capacitor being discharged to the second power source through the second rear capacitor; and the first rear capacitor electrically connected between the second power source and the ground potential, and the across-voltage of the first rear capacitor is discharged to the second power source;

wherein the plural switching signals operate the first and second sub-conversion circuits between the first and second electrical connection states to perform switched-capacitor voltage division of the first voltage, respectively switching the first switching node between the first divided voltage of the first voltage and the first reference potential obtained from the switched-capacitor voltage division, and switching the second switching node between the second divided voltage of the first voltage and the second reference potential, thereby converting the first power source to the second power source;

wherein the first and second reference potentials are respectively the across-voltage of the first rear capacitor and the across-voltage of the second rear capacitor, and both the first and second divided voltages are half of the first voltage.

3. The multi-phase conversion circuit of claim 2, wherein a duty cycle of the plural switching signals is 50%, and the across-voltages of both the first front capacitor and the second front capacitor are half of the first voltage, and the across-voltages of both the first rear capacitor and the second rear capacitor are a quarter of the first voltage.

4. The multi-phase conversion circuit of claim 1, further comprising a first inductor included in the first sub-conversion circuit and a second inductor included in the second sub-conversion circuit, wherein the first inductor is coupled between the first rear capacitor and the second power node, and the second inductor is coupled between the second rear capacitor and the second power node.

5. The multi-phase conversion circuit of claim 4, wherein the plural electrical connection states include a first electrical connection state and a second electrical connection state;

wherein the first electrical connection state includes:

the first front capacitor and the first rear capacitor serially connected between the first power node and the second power node, with the first power source charging the first front capacitor and the first rear capacitor through the first inductor;

the second front capacitor and the first front capacitor serially connected between the first power node and the ground potential, with the across-voltage of the second front capacitor being discharged to the second power source through the first inductor and the first rear capacitor; and the second rear capacitor and the second inductor serially connected between the second power source and the ground potential, with the second rear capacitor being discharged to the second power source through the second inductor;

wherein the second electrical connection state includes:

the second front capacitor and the second rear capacitor serially connected between the first power node and the second power node, with the first power source charging the second front capacitor and the second rear capacitor through the second inductor;

the first front capacitor and the second front capacitor serially connected between the first power node and the ground potential, with the first front capacitor being discharged to the second power source through the second inductor and the second rear capacitor; and the first rear capacitor and the first inductor serially connected between the second power source and the ground potential, with the first rear capacitor being discharged to the second power source through the first inductor;

wherein the plural switching signals operate the first and second sub-conversion circuits between the first and second electrical connection states to perform switched-capacitor voltage division of the first voltage, respectively switching the first switching node between the first divided voltage of the first voltage and the first reference potential obtained from the switched-capacitor voltage division, and the second switching node between the second divided voltage of the first voltage and the second reference potential, thereby converting the first power source to the second power source;

wherein the first and second reference potentials are respectively the across-voltage of the first rear capacitor and the across-voltage of the second rear capacitor, and both the first and second divided voltages are half of the first voltage.

6. The multi-phase conversion circuit of claim 5, wherein a duty cycle of the plural switching signals is 50%, and both the across-voltage of the first front capacitor and the across-voltage of the second front capacitor are half of the first voltage, and both the across-voltage of the first rear capacitor and the across-voltage of the second rear capacitor are a quarter of the first voltage.

7. The multi-phase conversion circuit of claim 5, wherein the switching frequency includes a first resonant frequency related to resonance of the first inductor with the first rear capacitor, and a second resonant frequency related to resonance of the second inductor with the second rear capacitor.

8. The multi-phase conversion circuit of claim 5, wherein the control circuit further generates the switching signals according to a zero-current detection signal indicating at least one of the following: a first inductor current flowing through the first inductor being zero, or a second inductor current flowing through the second inductor being zero.

9. The multi-phase conversion circuit of claim 8, wherein a time point when the first inductor current is zero is a first zero-current time point, a time point when the second inductor current is zero is a second zero-current time point, and the control circuit, after the first zero-current time point and/or the second zero-current time point, waits for a corresponding first dead-time and/or a second dead-time before generating the switching signals to switch the electrical connection states.

10. The multi-phase conversion circuit of claim 4, wherein the first inductor and the second inductor are electromagnetically coupled in an opposing manner through a magnetic material.

11. The multi-phase conversion circuit of claim 4, wherein a single inductor serves both as the first inductor and the second inductor.

12. The multi-phase conversion circuit of claim 4, wherein the control circuit adjusts a duty cycle of the plural switching signals according to a conversion ratio.

13. The multi-phase conversion circuit of claim 4, wherein an order in which the first front capacitor and the second front capacitor are electrically connected in series between the first power node and the ground potential alternates based on a specific period to achieve charge balance.

14. The multi-phase conversion circuit of claim 4, wherein the switching frequency is related to a resonant frequency, enabling the multi-phase conversion circuit to operate in a resonant mode, controlling a voltage ratio between the second voltage and the first voltage to be related to a division ratio of the first voltage and the first divided voltage or the second divided voltage of the first voltage; wherein the resonant frequency is related to a capacitance value of the first front capacitor and/or the first rear capacitor and an inductance value of the first inductor, or a capacitance value of the second front capacitor and/or the second rear capacitor and an inductance value of the second inductor.

15. The multi-phase conversion circuit of claim 4, wherein the switching frequency is significantly higher than a resonant frequency, enabling the multi-phase conversion circuit to operate in a non-resonant mode, thereby regulating the second voltage to a predetermined level or regulating the first voltage to a predetermined level; wherein the resonant frequency is related to a capacitance value of the first front capacitor and/or the first rear capacitor and an inductance value of the first inductor, or a capacitance value of the second front capacitor and/or the second rear capacitor and an inductance value of the second inductor.

16. A control method for a multi-phase conversion circuit, comprising:

generating plural switching signals to periodically switch electrical connection relationships of a first front capacitor and/or a first rear capacitor of a first sub-conversion circuit and a second front capacitor and/or a second rear capacitor of a second sub-conversion circuit within the multi-phase conversion circuit between plural electrical connection states, based on a switching frequency, for conducting power conversion between a first voltage of a first power source at a first power node and a second voltage of a second power source at a second power node; wherein the first sub-conversion circuit includes a first switch, a first front switched capacitor conversion circuit, and a first rear switched capacitor conversion circuit which are coupled in series, wherein the first switch is coupled to the first power node, the first front switched capacitor conversion circuit is coupled between the first switch and a first switching node, and the first rear switched capacitor conversion circuit is coupled between the first switching node and the second power node, wherein the first front switched capacitor conversion circuit includes a first front bridging switch, a first front low-side switch, a first front subordinate switch, and a first front capacitor, wherein the first rear switched capacitor conversion circuit includes a first rear bridging switch, a first rear low-side switch, a first rear subordinate switch, and a first rear capacitor, wherein the second sub-conversion circuit includes a second switch, a second front switched capacitor conversion circuit, and a second rear switched capacitor conversion circuit which are coupled in series, wherein the second switch is coupled to the first power node, the second front switched capacitor conversion circuit is coupled between the second switch and a second switching node, and the second rear switched capacitor conversion circuit is coupled between the second switching node and the second power node, wherein the second front switched capacitor conversion circuit includes a second front bridging switch, a second front low-side switch, a second front subordinate switch, and a second front capacitor, wherein the second rear switched capacitor conversion circuit includes a second rear bridging switch, a second rear low-side switch, a second rear subordinate switch, and a second rear capacitor; and operating the first front capacitor, the first rear capacitor, the second front capacitor, and/or the second rear capacitor to perform switched-capacitor voltage division of the first voltage between the plural electrical connection states, thereby switching the first switching node between a first divided voltage of the first voltage obtained from the switched-capacitor voltage division and a first reference potential, and switching the second switching node between a second divided voltage of the first voltage obtained from the switched-capacitor voltage division and a second reference potential, for the power conversion between the first power node and the second power node;

wherein the first reference potential and the second reference potential are each related to the first voltage or its divided voltage, a ground potential, an across-voltage of the first front capacitor, an across-voltage of the first rear capacitor, an across-voltage of the second front capacitor, and/or an across-voltage of the second rear capacitor;

wherein the first front subordinate switch is coupled between the first front capacitor and the first switching node, for determining whether the first front capacitor is electrically connected to the first switching node according to a corresponding switching signal;

wherein the first rear subordinate switch is coupled between the first rear capacitor and the second power node, for determining whether the first rear capacitor is electrically connected to the second power node according to a corresponding switching signal;

wherein the second front subordinate switch is coupled between the second front capacitor and the second switching node, for determining whether the second front capacitor is electrically connected to the second switching node according to a corresponding switching signal;

wherein the second rear subordinate switch is coupled between the second rear capacitor and the second power node, for determining whether the second rear capacitor is electrically connected to the second power node according to a corresponding switching signal.

17. The control method of claim 16, wherein the plural electrical connection states include:

a first electrical connection state, having:

the first front capacitor and the first rear capacitor serially connected between the first power node and the second power node, and the first power source charging the first front capacitor and the first rear capacitor;

the second front capacitor and the first rear capacitor serially connected between the second power node and the ground potential, and the across-voltage of the second front capacitor is discharged to the second power source through the first rear capacitor; and the second rear capacitor electrically connected between the second power source and the ground potential, and the across-voltage of the second rear capacitor is discharged to the second power source; and a second electrical connection state, having:

the second front capacitor and the second rear capacitor serially connected between the first power node and the second power node, and the first power source charging the second front capacitor and the second rear capacitor;

the first front capacitor and the second rear capacitor serially connected between the second power node and the ground potential, and the across-voltage of the first front capacitor is discharged to the second power source through the second rear capacitor; and the first rear capacitor electrically connected between the second power source and the ground potential, and the across-voltage of the first rear capacitor is discharged to the second power source;

wherein the plural switching signals operate the first sub-conversion circuit and the second sub-conversion circuit between the first electrical connection state and the second electrical connection state, to perform switched-capacitor voltage division of the first voltage, thereby switching the first switching node between the first divided voltage of the first voltage obtained from the switched-capacitor voltage division and the first reference potential, and switching the second switching node between the second divided voltage of the first voltage obtained from the switched-capacitor voltage division and the second reference potential, for the power conversion between the first power source and the second power source;

wherein the first reference potential and the second reference potential are respectively the across-voltage of the first rear capacitor and the across-voltage of the second rear capacitor, and both the first divided voltage and the second divided voltage are half of the first voltage.

18. The control method of claim 17, wherein a duty cycle of the plural switching signals is 50%, and both the across-voltage of the first front capacitor and the across-voltage of the second front capacitor are half of the first voltage, and both the across-voltage of the first rear capacitor and the across-voltage of the second rear capacitor are a quarter of the first voltage.

19. The control method of claim 16, wherein the multi-phase conversion circuit further includes a first inductor in the first sub-conversion circuit and a second inductor in the second sub-conversion circuit, wherein the first inductor is coupled between the first rear capacitor and the second power node, and the second inductor is coupled between the second rear capacitor and the second power node.

20. The control method of claim 19, wherein the plural electrical connection states include a first electrical connection state and a second electrical connection state:

wherein the first electrical connection state includes:

serially connecting the first front capacitor and the first rear capacitor between the first power node and the second power node, enabling the first power source charging the first front capacitor and the first rear capacitor through the first inductor;

serially connecting the second front capacitor and the first front capacitor between the first power node and the ground potential, enabling the across-voltage of the second front capacitor being discharged to the second power source through the first inductor and the first rear capacitor; and serially connecting the second rear capacitor and the second inductor between the second power source and the ground potential, enabling the second rear capacitor being discharged to the second power source through the second inductor;

wherein the second electrical connection state includes:

serially connecting the second front capacitor and the second rear capacitor between the first power node and the second power node, enabling the first power source charging the second front capacitor and the second rear capacitor through the second inductor;

serially connecting the first front capacitor and the second front capacitor between the first power node and the ground potential, enabling the first front capacitor being discharged to the second power source through the second inductor and the second rear capacitor; and serially connecting the first rear capacitor and the first inductor between the second power source and the ground potential, enabling the first rear capacitor being discharged to the second power source through the first inductor;

wherein the control method further comprises:

operating the first and second sub-conversion circuits between the first and second electrical connection states to perform switched-capacitor voltage division of the first voltage, respectively switching the first switching node between the first divided voltage of the first voltage and the first reference potential obtained from the switched-capacitor voltage division, and the second switching node between the second divided voltage of the first voltage and the second reference potential, thereby converting the first power source to the second power source;

wherein the first and second reference potentials are respectively the across-voltage of the first rear capacitor and the across-voltage of the second rear capacitor, and both the first and second divided voltages are half of the first voltage.

21. The control method of claim 20, wherein a duty cycle of the plural switching signals is 50%, and both the across-voltage of the first front capacitor and the across-voltage of the second front capacitor are half of the first voltage, and both the across-voltage of the first rear capacitor and the across-voltage of the second rear capacitor are a quarter of the first voltage.

22. The control method of claim 20, wherein the switching frequency includes a first resonant frequency related to resonance of the first inductor with the first rear capacitor, and a second resonant frequency related to resonance of the second inductor with the second rear capacitor.

23. The control method of claim 20, further comprising: generating the plural switching signals for switching between the electrical connection states according to a zero-current detection signal indicating at least one of the following: a first inductor current flowing through the first inductor being zero, or a second inductor current flowing through the second inductor being zero.

24. The control method for a multi-phase conversion circuit of claim 23, wherein a time point when the first inductor current is zero is a first zero-current time point, and a time point when the second inductor current is zero is a second zero-current time point, and the method further comprises: after the first zero-current time point and/or the second zero-current time point, waiting for a corresponding first dead-time period and/or a second dead-time period before generating the plural switching signals to switch the electrical connection state.

25. The control method of claim 19, further comprising: magnetically coupling the first inductor and the second inductor through a magnetic material in an electrically inverse manner.

26. The control method of claim 19, further comprising: configuring a single inductor to simultaneously serve as both the first inductor and the second inductor.

27. The control method of claim 19, further comprising adjusting a duty cycle of the plural switching signals according to a conversion ratio.

28. The control method of claim 19, further comprising: alternating an order in which the first front capacitor and the second front capacitor are electrically connected in series between the first power node and the ground potential based on a specific period to achieve charge balance.

29. The control method of claim 19, wherein the switching frequency is related to a resonant frequency, enabling the multi-phase conversion circuit to operate in a resonant mode, controlling a voltage ratio of the second voltage to the first voltage related to a division ratio of the first voltage to either the first divided voltage or the second divided voltage of the first voltage, wherein the resonant frequency relates to a capacitance value of the first front capacitor and/or the first rear capacitor with an inductance value of the first inductor, or a capacitance value of the second front capacitor and/or the second rear capacitor with an inductance value of the second inductor.

30. The control method of claim 19, wherein the switching frequency is significantly higher than a resonant frequency to an extent, enabling the multi-phase conversion circuit to operate in a non-resonant mode, thereby regulating the second voltage to a predetermined level, or regulating the first voltage to a predetermined level, wherein the resonant frequency is related to a capacitance value of the first front capacitor and/or the first rear capacitor with an inductance value of the first inductor, or a capacitance value of the second front capacitor and/or the second rear capacitor with the inductance value of the second inductor.

* * * * *